US011343694B2

(12) United States Patent
Lee et al.

(10) Patent No.: US 11,343,694 B2
(45) Date of Patent: May 24, 2022

(54) OPTIONS TO PROVIDE A NETWORK ICON IN NON-STANDALONE MODE

(71) Applicant: QUALCOMM Incorporated, San Diego, CA (US)

(72) Inventors: Kuo-Chun Lee, San Diego, CA (US); Arvind Vardarajan Santhanam, San Diego, CA (US); Reza Shahidi, San Diego, CA (US); Srinivasan Balasubramanian, San Diego, CA (US); Aziz Gholmieh, Del Mar, CA (US); Oronzo Flore, Barcelona (ES); Haris Zisimopoulos, London (GB); Gerardo Giaretta, Altavilla Vicentina (IT); Suli Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 15/982,707

(22) Filed: May 17, 2018

(65) Prior Publication Data
US 2018/0368016 A1      Dec. 20, 2018

Related U.S. Application Data

(60) Provisional application No. 62/520,350, filed on Jun. 15, 2017, provisional application No. 62/516,537, (Continued)

(51) Int. Cl.
*H04W 24/10*     (2009.01)
*H04W 48/18*     (2009.01)
(Continued)

(52) U.S. Cl.
CPC .......... *H04W 24/10* (2013.01); *H04B 17/318* (2015.01); *H04W 48/18* (2013.01);
(Continued)

(58) Field of Classification Search
CPC ..... H04W 24/10; H04W 64/00; H04W 76/15; H04W 17/318; H04W 56/001; H04W 28/02; H04W 48/16
See application file for complete search history.

(56) References Cited

U.S. PATENT DOCUMENTS

| 10,314,006 B2 | 6/2019 | Wallentin et al. | |
| 2009/0163195 A1* | 6/2009 | Kim ..................... | H04W 48/18 455/422.1 |

(Continued)

FOREIGN PATENT DOCUMENTS

| CN | 101772219 A | 7/2010 |
| CN | 106304271 A | 1/2017 |

(Continued)

OTHER PUBLICATIONS

International Search Report and Written Opinion—PCT/US2018/033360—ISA/EPO—dated Jul. 25, 2018.

(Continued)

*Primary Examiner* — Anez C Ebrahim
(74) *Attorney, Agent, or Firm* — Haynes and Boone, LLP

(57) ABSTRACT

Wireless communications systems and methods related to providing an indication that a user equipment (UE) is within coverage by a particular network are provided. An example method of wireless communications obtaining, by a first wireless communication device from a second device associated with a second network, information regarding whether the first wireless communication device is within coverage by a first network. The first wireless communication device supports dual connectivity with the first network and the second network. The method also includes determining, based at least in part on the information, whether to display an icon indicating that the first wireless communication device is connected to the first network. The method further includes in response to a determination to display the (Continued)

icon, displaying, by the first wireless communication device, the icon on a display coupled to the first wireless communication device.

30 Claims, 17 Drawing Sheets

Related U.S. Application Data filed on Jun. 7, 2017, provisional application No. 62/508,834, filed on May 19, 2017.

(51) Int. Cl.
| | |
|---|---|
| *H04B 17/318* | (2015.01) |
| *H04W 76/15* | (2018.01) |
| *H04W 56/00* | (2009.01) |
| *H04W 64/00* | (2009.01) |
| *H04W 88/06* | (2009.01) |

(52) U.S. Cl.
CPC ......... *H04W 56/001* (2013.01); *H04W 64/00* (2013.01); *H04W 76/15* (2018.02); *H04W 88/06* (2013.01)

(56) References Cited

U.S. PATENT DOCUMENTS

| | | | |
|---|---|---|---|
| 2011/0035191 A1 | 2/2011 | Roh et al. | |
| 2011/0261792 A1* | 10/2011 | Oerton | H04M 1/724 370/335 |
| 2012/0060031 A1* | 3/2012 | Huang | H04N 21/8355 713/168 |
| 2014/0254457 A1 | 9/2014 | Panpaliya et al. | |
| 2015/0148039 A1* | 5/2015 | Yang | H04W 36/0085 455/436 |
| 2015/0282249 A1 | 10/2015 | Edwards et al. | |
| 2015/0341855 A1* | 11/2015 | Bergman | H04W 48/18 370/329 |
| 2016/0261675 A1 | 9/2016 | Block et al. | |
| 2016/0360456 A1 | 12/2016 | Vashi et al. | |
| 2016/0366612 A1 | 12/2016 | Wu | |
| 2017/0034745 A1 | 2/2017 | Dhanapal et al. | |
| 2017/0064593 A1 | 3/2017 | Khay-Ibbat et al. | |
| 2017/0171782 A1* | 6/2017 | Mohamed | H04W 36/0011 |
| 2018/0020418 A1* | 1/2018 | Chandramouli | H04W 60/00 |
| 2018/0062911 A1* | 3/2018 | Park | H04L 63/0421 |
| 2018/0249400 A1* | 8/2018 | Harada | H04J 11/0079 |
| 2020/0322854 A1 | 10/2020 | Ryoo et al. | |

FOREIGN PATENT DOCUMENTS

| | | |
|---|---|---|
| CN | 106572205 A | 4/2017 |
| EP | 1089499 A2 | 4/2001 |
| EP | 2958375 A2 | 12/2015 |
| JP | 2013255081 A | 12/2013 |
| WO | 2008013291 A1 | 1/2008 |
| WO | 2010148290 A1 | 12/2010 |
| WO | 2011125697 A1 | 10/2011 |
| WO | WO-2016116145 A1 | 7/2016 |
| WO | 2016126238 A1 | 8/2016 |
| WO | WO-2016130061 A1 | 8/2016 |
| WO | 2016190013 A1 | 12/2016 |
| WO | 2017038741 A1 | 3/2017 |
| WO | WO-2017059889 A1 | 4/2017 |

OTHER PUBLICATIONS

Qualcomm Incorporated: "NR AS Key Derivation Principles", 3GPP TSG-RAN WG2 Meeting #97, R2-1701789, Athens, Greece, Feb. 13, 2017-Feb. 17, 2017, Feb. 3, 2017 (Feb. 3, 2017), 3 Pages.
Samsung: "RRC Specification for 5G", 3GPP TSG-RAN2#93 bis Meeting, R2-162308, Dubrovnik, Croatia, Apr. 11, 2016-Apr. 15, 2016, 2 Pages, Mar. 31, 2016 (Mar. 31, 2016).
3GPP TR 38.804: "3rd Generation Partnership Project, Technical Specification Group Radio Access Network, Study on New Radio Access Network, Study on New Radio Access Technology, Radio Interface Protocol Aspects (Release 14)", 3GPP Standard, Technical Report, 3GPP TR 38.804, 3rd Generation Partnership Project (3GPP), Mobile Competence Centre, 650, Route Des Lucioles, F-06921 Sophia-Antipolis Cedex, France, vol. Ran WG2, No. V14.0.0, Mar. 24, 2017, XP051297619, pp. 1-57, Paragraph 4,5 and Paragraph 10.2., Abstract.
"3rd Generation Partnership Project, Technical Specification Group Radio Access Network, Evolved Universal Terrestrial Radio Access (E-UTRA), Radio Resource Control (RRC), Protocol Specification (Release 14)", 3GPP Standard, Technical Specification 3GPP TS 36.331 V14.2.2, (Apr. 2017) Apr. 20, 2017, 721 Pages.
Ericsson, et al., "On the Assumptions and Evaluation Metrics for D2D Scenarios", 3GPP Draft, 3GPP TSG-RAN WG1 Meeting #73, (Academic literature, etc. 2013-10006-604), R1-132458, Fukuoka, Japan, May 20-24, 2013, 5 Pages.

\* cited by examiner under "one or more embodiments" language suggests that such embodiments are only examples, and do not limit the scope of the invention.

OPTIONS TO PROVIDE A NETWORK ICON IN NON-STANDALONE MODE

CROSS REFERENCE TO RELATED APPLICATIONS & PRIORITY CLAIM

The present application claims priority to and the benefit of the U.S. Provisional Patent Application Nos. 62/508,834 filed May 19, 2017, 62/516,537 filed Jun. 7, 2017, and 62/520,350 filed Jun. 15, 2017, which are hereby incorporated by reference in their entirety.

TECHNICAL FIELD

This application relates to wireless communication systems, and more particularly to providing an indication to a user that a user equipment (UE) may connect to a New Radio (NR) network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

To meet the growing demands for expanded connectivity, wireless communication technologies or RATs are advancing from the LTE technology to a next generation new radio (NR) technology. For example, NR may provide lower latency and a higher bandwidth or throughput then LTE. One approach to providing the improved NR functionalities is to deploy an NR network within an LTE network. In other words, the NR network may be overlaid on top of the LTE network with overlapping coverage areas, where the NR network and the LTE network may operate over overlapping spectrums. Accordingly, co-existence and efficient resource utilization between LTE and NR may be important.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communications includes obtaining, by a first wireless communication device from a second device associated with a second network, information regarding whether the first wireless communication device is within coverage by a first network. The first wireless communication device supports dual connectivity with the first network and the second network. The method also includes determining, based at least in part on the information, whether to display an icon indicating that the first wireless communication device is connected to the first network. The method further includes in response to a determination to display the icon, displaying, by the first wireless communication device, the icon on a display coupled to the first wireless communication device.

In an additional aspect of the disclosure, a system for wireless communication includes a receiver that obtains information, from a second device associated with a second network, regarding whether a first wireless communication device is within coverage by a first network. The first wireless communication device supports dual connectivity with the first network and the second network. The system also includes a user interface (UI) that determines, based at least in part on the information, whether to display an icon indicating that the first wireless communication device is connected to the first network. In response to a determination to display the icon, the UI displays the icon on a display coupled to the first wireless communication device.

In an additional aspect of the disclosure, an apparatus for wireless communication includes means for obtaining, by a first wireless communication device from a second device associated with a second network, information regarding whether the first wireless communication device is within coverage by a first network. The first wireless communication device supports dual connectivity with the first network and the second network. The apparatus also includes means for determining, based at least in part on the information, whether to display an icon indicating that the first wireless communication device is connected to the first network. The apparatus further includes means for in response to a determination to display the icon, displaying, by the first wireless communication device, the icon on a display coupled to the first wireless communication device.

In an additional aspect of the disclosure, a computer-readable medium having program code recorded thereon includes code for obtaining, by a first wireless communication device from a second device associated with a second network, information regarding whether the first wireless communication device is within coverage by a first network. The first wireless communication device supports dual connectivity with the first network and the second network. The program code further includes code for determining, based at least in part on the information, whether to display an icon indicating that the first wireless communication device is connected to the first network. The program code also includes code for in response to a determination to display the icon, displaying, by the first wireless communication device, the icon on a display coupled to the first wireless communication device.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

Figure 1:
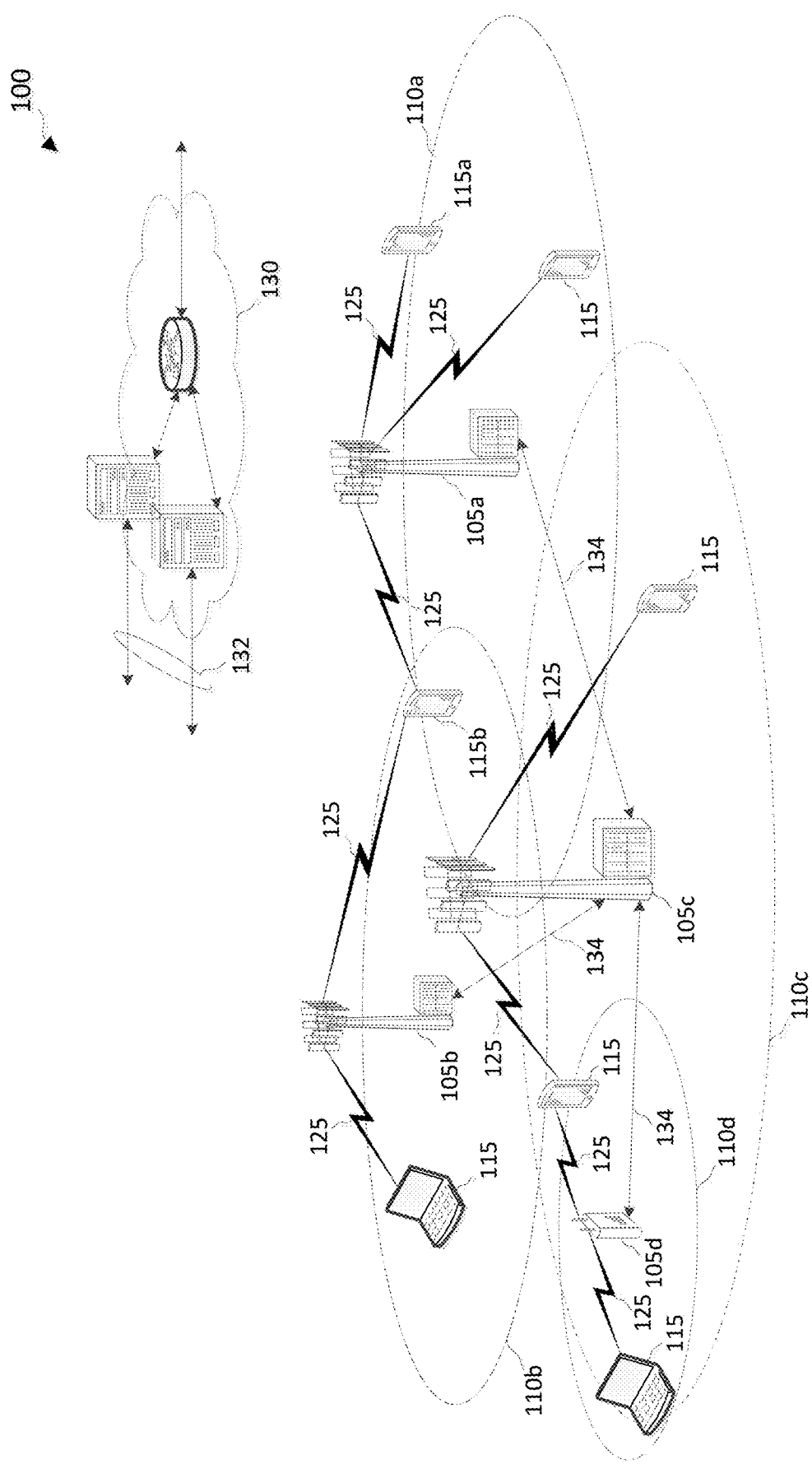
FIG. 1 illustrates a wireless communication network according to embodiments of the present disclosure.

The present application describes mechanisms for providing to a user an indication that the user requirement (UE) is connected to a new radio (NR) network. FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105*a*, 105*b* and 105*c* are examples of macro BSs for the coverage areas 110*a*, 110*b* and 110*c*, respectively. The BSs 105*d* is an example of a pico BS or a femto BS for the coverage area 110*d*. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into min-slots, as described in greater detail herein. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a sector identity value (e.g., 0, 1, 2, etc.). The UE 115 may then receive a secondary synchronization signal (SSS). The SSS may enable radio frame synchronization, and may provide a cell identity value, which may be combined with the PSS identity value to identify the physical cell identity. The SSS may also enable detection of a duplexing mode and a cyclic prefix length. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105*a* and the UE 115*a* may be associated with one network operating entity, while the BS 105*b* and the UE 115*b* may be associated with another network operating entity. By time-partitioning the shared spectrum according to network operating entities, the communications between the BS 105*a* and the UE 115*a* and the communications between the BS 105*b* and the UE 115*b* may each occur during respective time periods and may avail themselves of an entirety of a designated shared spectrum.

In an embodiment, the network 100 may support multiple networks with different RAT technologies. For example, the network 100 may be initially deployed as an LTE network and subsequently add advanced RAT technologies such as NR to provide improved network functionalities, such as lower latency, greater bandwidth, and/or higher throughput. Mechanisms for deploying an NR network within an LTE network are described in greater detailer herein.

Figure 2:
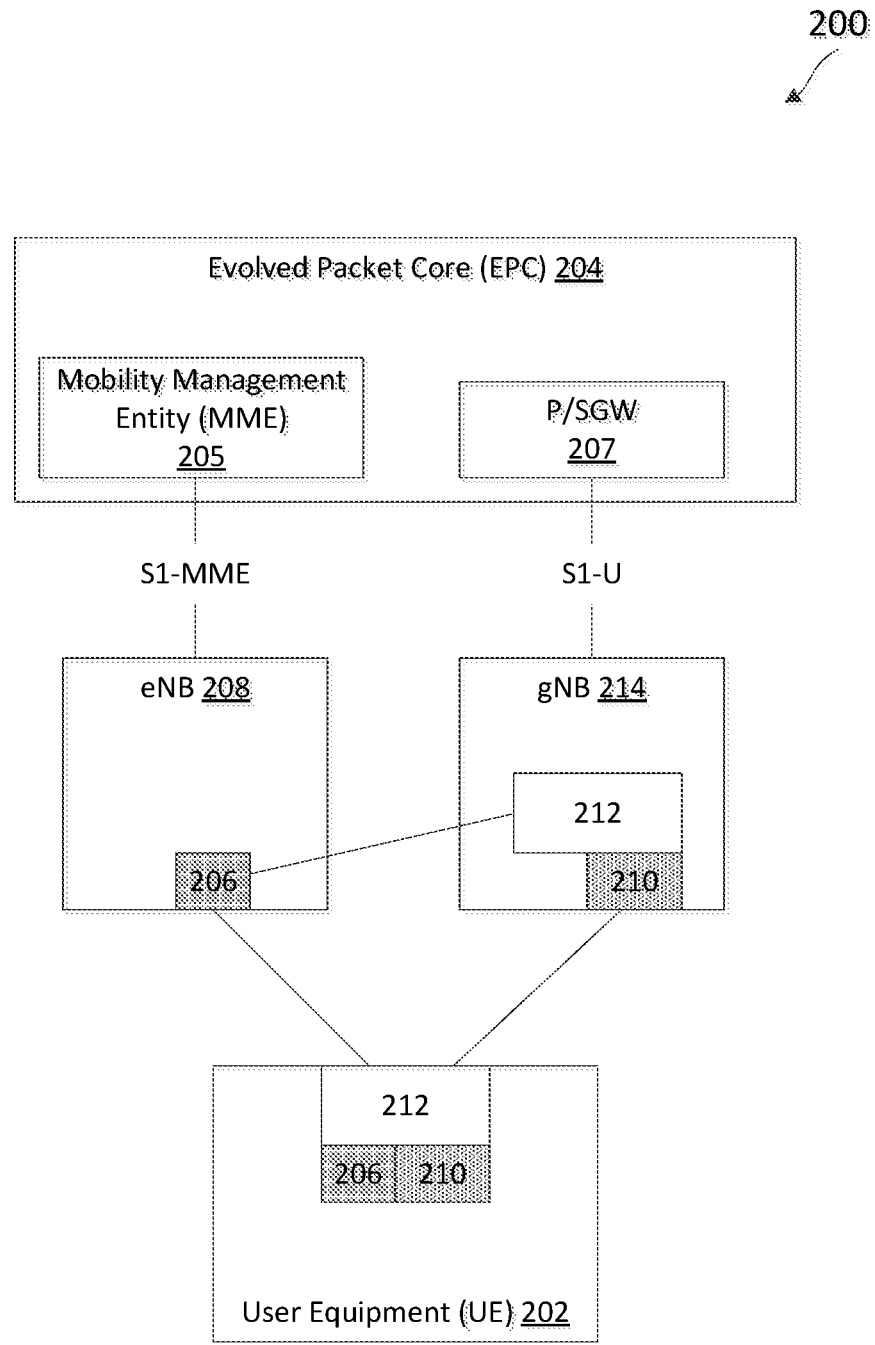
FIG. 2 illustrates a network system according to embodiments of the present disclosure.

FIG. 2 illustrates a network system 200 according to embodiments of the present disclosure. The system 200 may correspond to a portion of the network 100 and include an LTE-NR tight interworking architecture with dual connectivity. The NR network may be unstable because it does not have ubiquitous coverage and has small cell radius. To overcome this problem, it may be desirable for a UE 115 to connect to both the LTE network and the NR network. In an embodiment, the NR network may be overlaid over the LTE network. The UE 202 supports dual connectivity, which allows the UE 202 to connect to both the LTE and NR network simultaneously. The UE 202 supports a non-standalone mode that utilizes the LTE network to support the connectivity of the UE 202 to the NR network. If the UE 202 is connected to the NR network, the UE 202 is also connected to the LTE network. The NR network may be a "best effort" network that is anchored in the LTE network. For example, if the UE 202 is within NR network coverage, the UE 202 will use the NR network to transmit data. In this example, the UE 202 harnesses the lower latency, greater bandwidth, and/or higher throughput offered by the NR network, while leveraging the stable links provided by the LTE network. If the connection to the NR network is not stable or is weak, the UE 202 may connect to the LTE network without connecting to the NR network.

The UE 202 may transmit data using an Evolved Packet Core (EPC) 204, which is the core network of the LTE system. The EPC 204 includes a Mobility Management Entity (MME) 205 and a P/SGW 207. The data traffic may be split. For example, the UE 202 may transmit LTE Radio Link Control (RLC)/Media Access Control (MAC) 206 to an eNB 208 and transmit NR RLC/MAC 210 and LTE/NR Packet Data Convergence Protocol (PDCP) 212 to the gNB 214. A split bearer may be located at the gNB 214, and the data sent to the eNB 208 will be merged at the gNB 214 with other data. The gNB 214 may aggregate the data and send it to the P/SGW 207 using the S1-U interface. Additionally, signaling information may pass through the eNB 208 to the MME 205 using the S1-MME interface. Although FIG. 2 illustrates an LTE-NR/EPC system, this is not intended to be limiting and other embodiments may include different systems. For example, in another embodiment, the system may include an LTE-NR/NGC system.

In some embodiments, the UE 202 may be in at most one state of a plurality of states. If the UE 202 is connected to a first network (e.g., NR network, 5G network, etc.) and a second network (e.g., LTE network, 4G network, etc.) simultaneously, the UE 202 is in a first connected mode. In this example, the UE 202 may be connected to both the NR network and the LTE network. The LTE network may be associated with an LTE cell, and the NR network may be associated with an NR cell. If the UE 202 is connected to the second network, but not the first network, the UE 202 is in a second connected mode. In this example, the UE 202 may be connected to the LTE network, but not to the NR network. If the UE 202 is idle, the UE 202 is in an idle mode connected to the second network, but not the first network. In this example, the UE 202 may be camped in the LTE network. The UE 202 may be in the idle mode if the UE 202 has no data to transmit or is not receiving data from another device.

If the UE 202 is in the second connected mode or the idle mode, however, the UE 202 may be unable to know whether the UE 202 is within coverage by the NR network or be able to receive the NR signal strength information. For example, if the UE 202 is in the idle mode, the UE 202 monitors the LTE network, not the NR network. Accordingly, the UE 202 cannot display on a display screen coupled to the UE 202 an icon (e.g., coverage bar of the 5G icon) indicating that the UE 202 is connected to the NR network. The icon includes a mobile network signal strength indicator associated with the 5G network/NR network.

If the UE 202 knows the frequency in which the NR network operates, the UE 202 may be able to determine whether the UE 202 is within coverage by the NR network. If the UE 202 knows the frequency, the UE 202 may tune to this frequency and transmit data.

Figure 3:
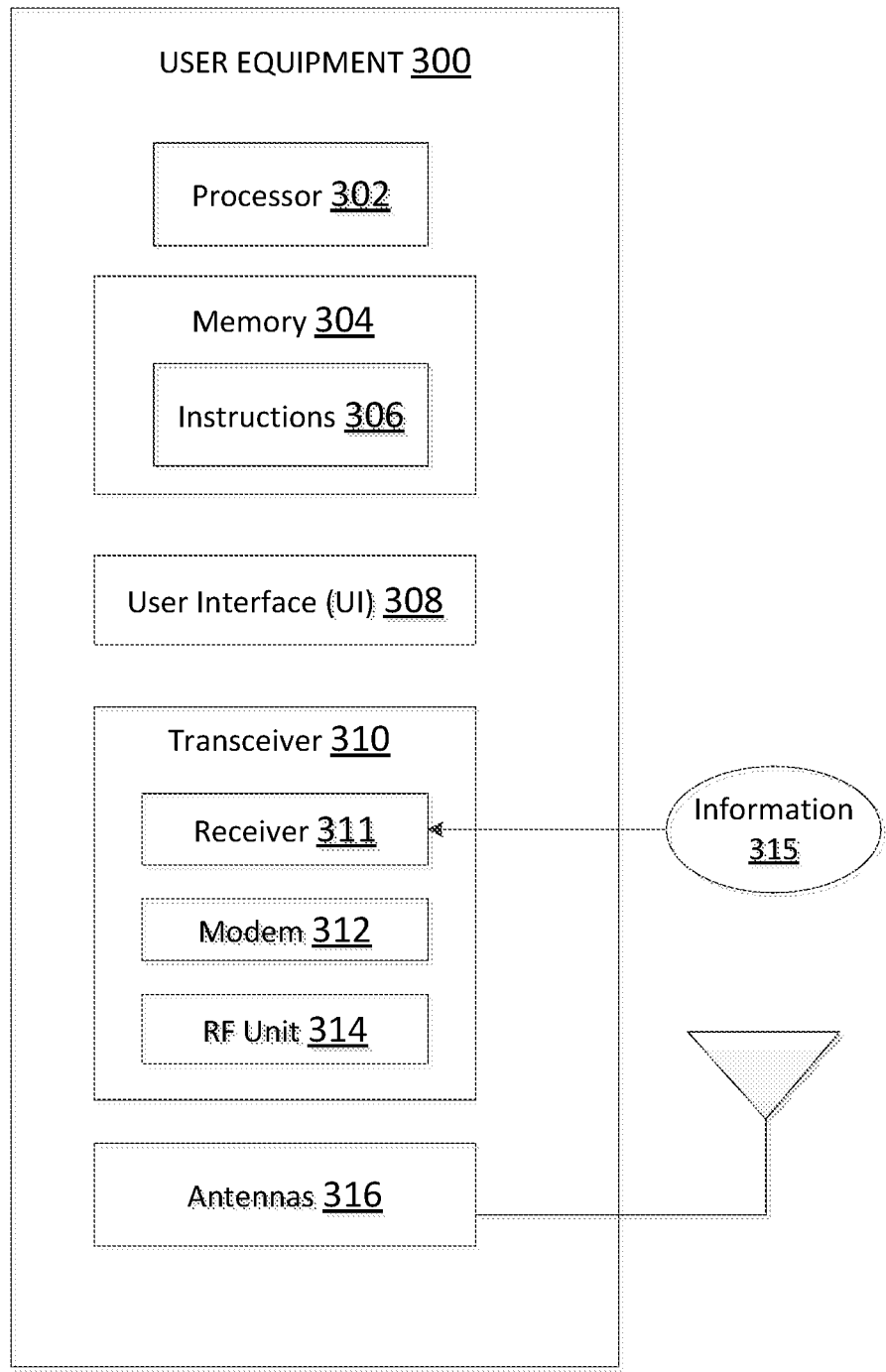
FIG. 3 is a block diagram of an exemplary user equipment (UE) according to embodiments of the present disclosure.

FIG. 3 is a block diagram of an exemplary UE 300 according to embodiments of the present disclosure. The UE 300 may be a UE 115, 202 as discussed above. As shown, the UE 300 may include a processor 302, a memory 304, a user interface (UI) 308, a transceiver 310 including a receiver 311, a modem subsystem 312, and a radio frequency (RF) unit 314, and one or more antennas 316. These elements may be in direct or indirect communication with each other, for example via one or more buses.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 304 may store instructions 306. The instructions 306 may include instructions that, when executed by the processor 302, cause the processor 302 to perform the operations described herein with reference to the UEs 115, 202 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

As shown, the transceiver 310 may include the receiver 311, the modem subsystem 312, and the RF unit 314. The transceiver 310 can be configured to communicate bi-directionally with other devices, such as the BSs 105. The UE 202 supports dual connectivity with the LTE network and the NR network. The modem subsystem 312 may be configured to modulate and/or encode the data from the memory 304 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the receiver 311, the modem subsystem 312, and/or the RF unit 314 may be separate devices that are coupled together at the UE 300 to enable the UE 300 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of CQI reports and/or SRSs according to embodiments of the present disclosure. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

The receiver 311 obtains information 315, from another device associated with a first network (e.g., 4G network or LTE network), regarding whether the UE 202 is within coverage by a second network (e.g., 5G network or NR network). The other device may include a cell (e.g., LTE cell) that supports the first network. The UI 308 may determine, based at least in part on the information 315, whether the UI 308 is within coverage by the NR network. The UI 308 determines, based at least in part on the information 315, whether to display an icon indicating that the UE 202 is connected to the NR network. In response to a determination to display the icon, the UE 202 displays the icon on a display coupled to the UE 202.

Figure 4:
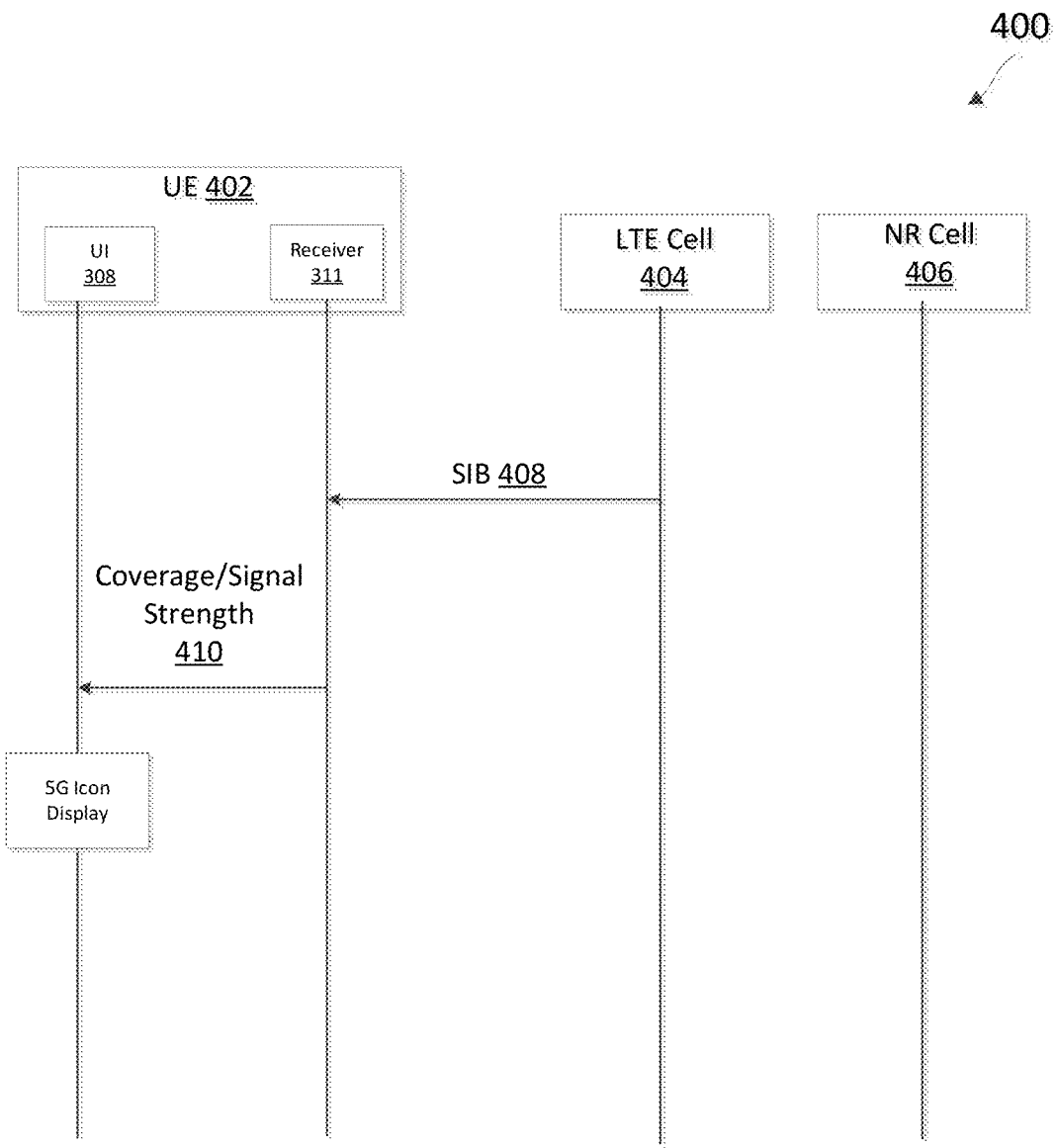
FIG. 4 illustrates a call flow according to embodiments of the present disclosure.

FIG. 4 illustrates a call flow 400 according to embodiments of the present disclosure. In the example illustrated in FIG. 4, an LTE cell 404 transmits a system information block (SIB) 408 (e.g., SIB1, SIB2, or ENDC indication bit) with an indication of whether the UE 402 is within coverage by the NR network, which may be supported by an NR cell 406. The SIB 408 may include a bit that indicates whether the UE 202 is within coverage by the NR network. The LTE cell 404 may broadcast the SIBs. In reference to FIG. 3, the receiver 311 may obtain the information 315 by receiving the SIB 408 with an indication of whether the UE 202 is within coverage by the NR network.

The SIB 408 includes an indication bit indicating whether the UE 202 is within coverage by the NR network. If the indication bit indicates that the UE 202 is within coverage by the NR network, the receiver 311 may pass a coverage/signal strength 410 with this information along to the UI 308, which may display a 5G icon of coverage based on the coverage/signal strength 410. If the indication bit indicates that the UE 202 is not within coverage by the NR network, the receiver 311 may pass the coverage/signal strength 410 with this information along to the UI 308, which will report no coverage by the NR network. The receiver 311 may obtain these SIBs regardless of whether the UE 202 is actually within coverage by the NR network. The UE 402 may connect to the LTE network and the NR network, if appropriate.

Figure 5:
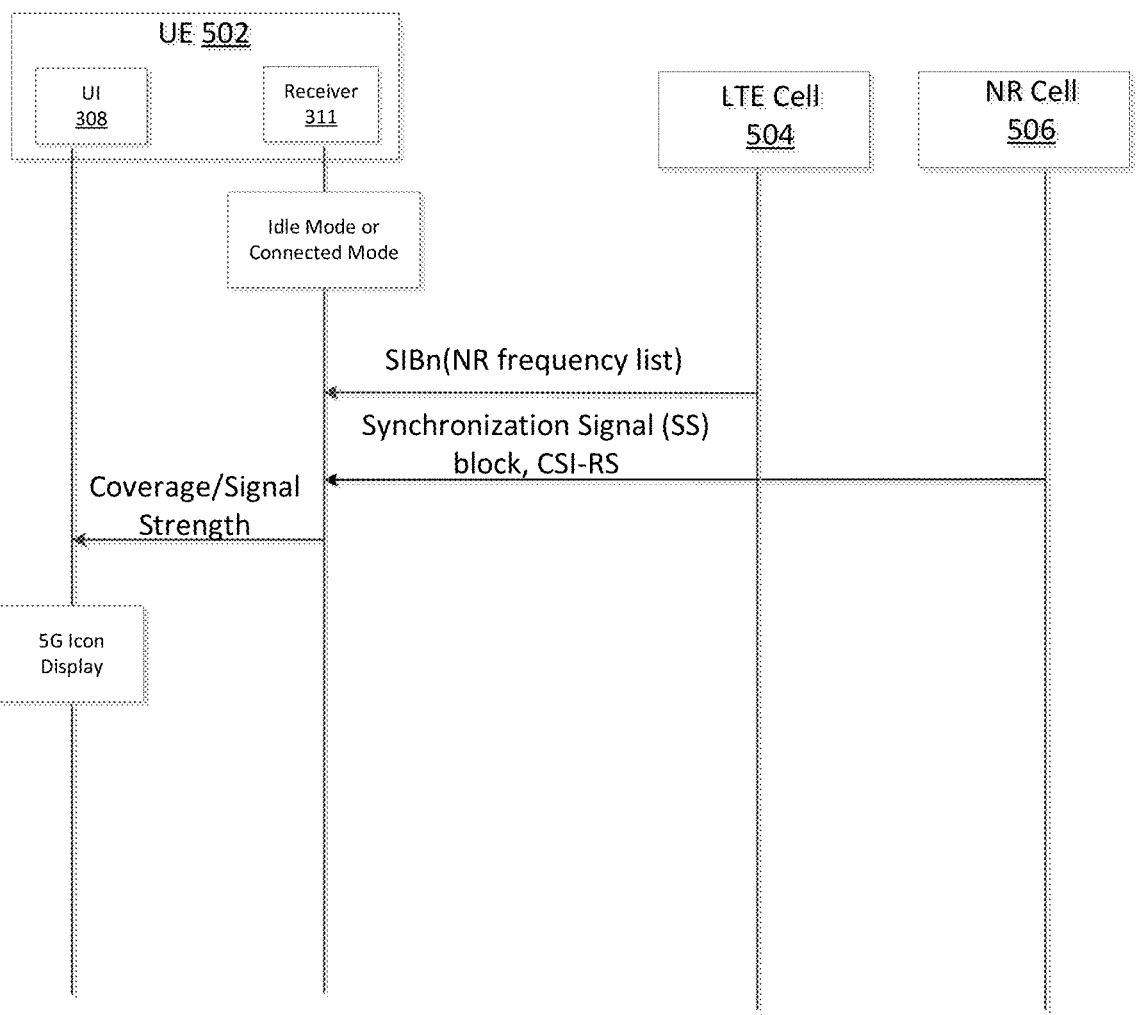
FIG. 5 illustrates a call flow according to embodiments of the present disclosure.

FIG. 5 illustrates a call flow 500 according to embodiments of the present disclosure. In the example illustrated in FIG. 5, an LTE cell 504 transmits a SIB including an NR frequency list. The NR frequency list includes one or more NR frequencies in which the NR network operates. A SIB may include the NR frequency list. A new parameter of an existing SIB or a new SIB (e.g., SIB 22) may include the frequency list. Additionally, an NR cell 506 transmits a synchronization signal (SS) block and the CSI-RS. Furthermore, the new SIB or new parameter in the existing SIB may include additional information of SS block configuration, e.g. subcarrier spacing, time schedule to transmit SS blocks, periodicity to transmit the SS burst set that has multiple SS blocks, number of SS blocks per SS burst set, etc. Furthermore, the new SIB or new parameter in the existing SIB may include additional information of CSI-RS, e.g. time schedule to transmit CSI-RS. In reference to FIG. 3, the receiver 311 may obtain the information 315 by receiving the SIB including the frequency list from the LTE cell 504 and receiving the SS block and the CSI-RS from the NR cell 506. The NR cell 506 supports the NR network. Additionally, the UE 502 may be in idle mode or any of the connected modes (e.g., connected to both the LTE network and the NR network, or connected to only the LTE network).

The UE 502 may use a variety of techniques to determine whether the UE 502 is within coverage by the NR network. In some embodiments, if the UE 502 is connected to both the LTE network and the NR network, the UE 502 actively receives the NR and the UE 502 reports the CSI and the Radio Link Monitoring (RLM). The UE 502 leverages these measurements to display the 5G icon.

In some embodiments, if the UE 502 is connected to the LTE network, but not the NR network, the UE 502 may measure the NR for dual connectivity addition. The LTE cell 504 configures an NR measurement object that contains the frequency list of the NR network and that the UE 502 measures. The UE 502 can leverage the measurement result to display the 5G icon. In an example, the UE 502 uses the frequency list to search the SS block in each of the frequencies listed in the frequency list. The SS block includes the NR-PSS, the NR-SSS, and the NR-PBCH for a particular frequency. The NR-PSS may be used to identify symbol timing and sector identity. The NR-SSS may be used to identify cell identity. The NR-PBCH may be used to indicate the SFN and current SS block index within the SS burst set. Additionally, the PBCH has a parameter to signal the NR bandwidth of the frequency channel (e.g., 100 MHz).

For one or more frequencies listed in the frequency list, the UE 502 receives from the NR cell 506 an SS block including an NR-PRR, an NR-SSS, and an NR-PBCH associated with the respective frequency. The UE 502 measures a signal strength of the NR-PSS and the NR-SSS and determines whether the signal strength satisfies a threshold. In response to a determination that the signal strength satisfies the threshold, the UE 502 determines to display the 5G icon. Accordingly, UI 308 displays the icon. In response to a determination that the signal strength does not satisfy the threshold, the UE 502 determines to not display the 5G icon. Accordingly, the UI 308 reports on the display no coverage by the NR network. The UI 308 may report no coverage by the NR network by not displaying the 5G icon on the display. If the LTE cell 504 broadcasts a new SIB including the NR frequency list, but there is no NR measurement object, the UE 502 may use the information in the SIB to measure the NR and display the 5G icon, if appropriate. If, however, the SIB does not include the NR frequency list and there is also no NR measurement object, the UE 502 may report no coverage by the NR network.

In some embodiments, if the UE 502 determines the symbol boundary from the NR-PSS and the cell identity by the NR-SSS and NR-PSS, the UE 502 may measure the signal strength of the NR-PSS and the NR-SSS. If the signal strength is greater than a threshold, the UE 502 may determine that the UE 502 is within coverage by the NR network, and thus the UI 308 may display the 5G icon on a display coupled to the UE 502. If it is not, the UE 502 may determine that the UE 502 is not within coverage by the NR network, and accordingly report on the display no coverage by the NR network.

In some embodiments, for one or more frequencies listed in the frequency list, the UE 502 receives from the NR cell 506 an SS block including an NR-PSS, an NR-SSS, and an NR-PBCH (Physical Broadcast Channel) associated with the respective frequency. The UE 502 determines system frame number information and an NR bandwidth of a frequency channel associated with the SS block, and measures a CSI-RS (Channel State Information Reference Signal) based on the system frame number information and the NR bandwidth to determine whether the UE 502 is within coverage by the NR network. The UE 502 acquires the NR-PBCH to determine the system frame number information and NR bandwidth of the frequency channel After the UE 502 acquires the NR-PSS and the NR-SSS, the UE 502 measures the CSI-RS to determine whether the UE 502 is within coverage by the NR network.

In some embodiments, if the UE 502 is in the idle mode and the LTE cell 504 broadcasts a new SIB including the NR frequency list, the UE 502 may measure the NR and display the 5G icon, if appropriate. If the UE 502 is in the idle mode and there is not a frequency list included in the SIB, then the UE 502 may report no coverage by the NR network. An LTE SIB of NR may include more parameters, e.g. cell reselection from LTE to 5G. For a non-standalone mode UE, the UE may use a parameter different from the SIB for determining whether to display the 5G bar in the 5G icon. Alternatively, an existing SIB, e.g. SIB5, may signal neighbor NR frequencies.

Figure 6:
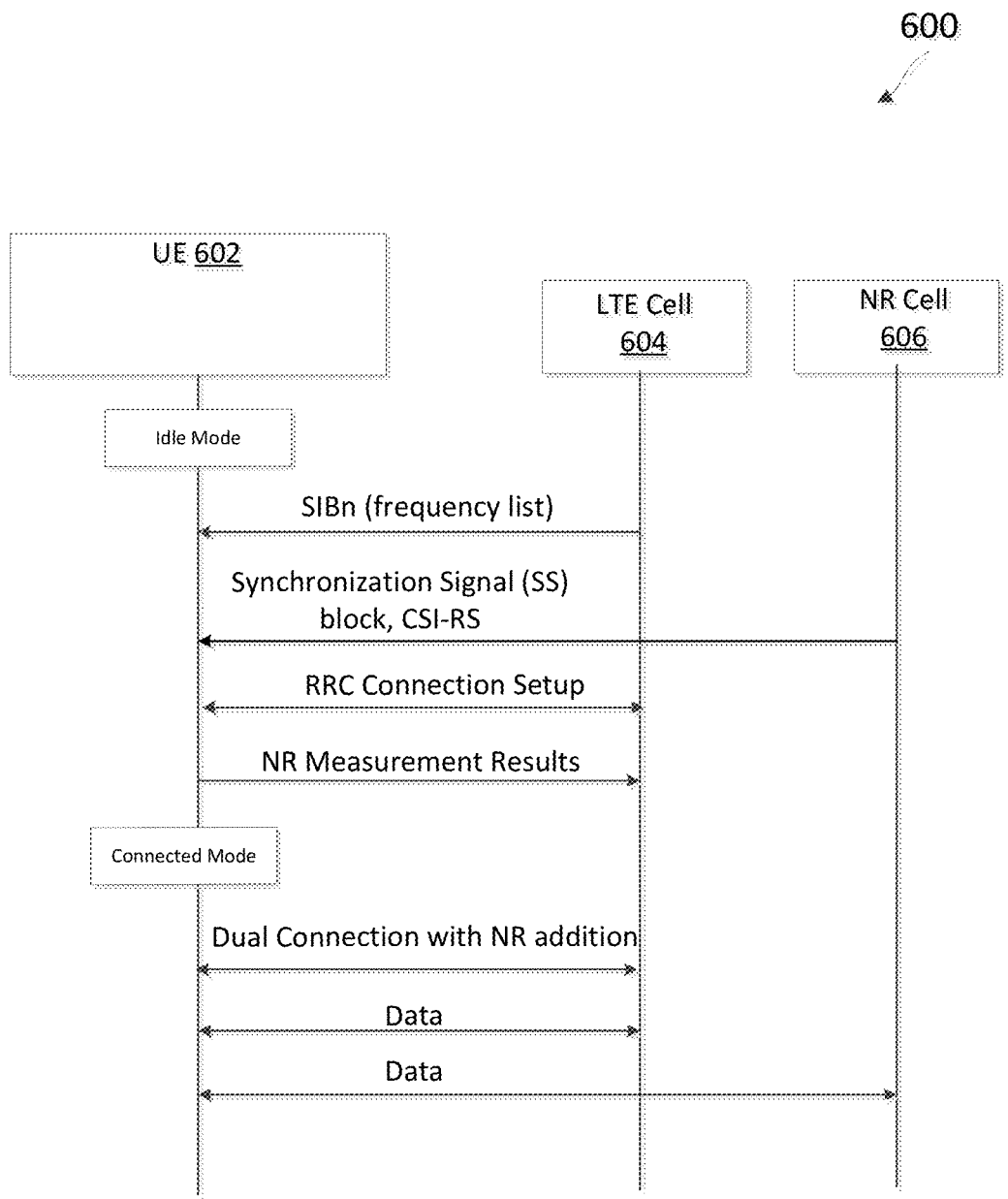
FIG. 6 illustrates a call flow for fast dual connectivity setup according to embodiments of the present disclosure.

FIG. 6 illustrates a call flow 600 for fast dual connectivity setup, according to embodiments of the present disclosure. In the example illustrated in FIG. 6, a UE 602 is in idle mode. An LTE cell 604 transmits a SIB including a frequency list. An NR cell 606 transmits an SS block and CSI-RS. The UE 602 receives the SIB from the LTE cell 604 and the SS block and the CSI-RS from the NR cell 606.

If the UE 602 desires to transmit or receive data, the UE 602 may set up an RRC connection. The UE 602 may send NR measurement results to the LTE cell 604. The UE 602 may prepare the measurement in advance and send the connection setup information to the LTE cell 604. The LTE cell 604 may determine that the UE 602 has a strong signal strength associated with the NR network. During the RRC connection setup, the LTE cell 604 may configure the UE 602 to be in the dual connectivity mode. After the UE 602 is in the dual connectivity mode, the UE 602 may transmit and receive data both from the LTE network and the NR network. An advantage of this feature may allow for display of an accurate bar associated with the 5G icon. Additionally, this may allow LTE-to-NR reselection of the 5G standalone mode of the future.

In some embodiments and in reference to FIG. 3, the receiver 311 may obtain the information 315 by receiving a measurement object that is configured by the LTE cell. The measurement object may include a frequency list specifying frequencies in which the NR network operates and provides bandwidth of a frequency channel. The UE may search the one or more frequencies in accordance with the measurement object and measure the one or more frequencies to determine whether the US is within coverage by the NR network. In an example, the measurement object is an NR measurement object, and the frequency list specifies frequencies in which the NR network operates. If the UE receives the measurement object and the bandwidth of the frequency channel, the UE may more easily know where to search and measure the signal of the NR cells.

If the UE is in dual connectivity mode and connected to both the LTE network and NR network, the discussion regarding FIG. 5 may apply. If the UE is connected to the LTE network, but not the NR network, the UE may use the measurement object (e.g., NR measurement object) to search and measure the NR. The LTE cell may configure the measurement object. If the UE has previously connected to the LTE cell, the UE may have already received a measurement object from the LTE cell and cached the measurement object. In some examples, the UE may retrieve this cached measurement object. If the UE does not receive a measurement object or does not have a cached measurement object for this LTE cell or tracking area, then the UE does not perform a search for NR. In this example, the UI reports on the display no coverage by the NR network.

If the UE is in the idle mode, the UE continues to cache measurement objects from when the UE was in the connected mode, per LTE cell or TAI (tracking area). The UE may use the cached measurement object per LTE cell or TAI to know NR neighbor coverage of the current camped cell to search and measure NR and display the 5G icon.

It may be advantageous to provide optimization opportunities for the UE. For example, in some embodiments and in reference to FIG. 3, the receiver 311 may obtain the information 315 by retrieving it from an acquisition database (not shown) that stores the information. The acquisition database may store information including the frequencies (e.g., NR frequencies) within which the NR network operates. The UE may use the acquisition database to determine the NR cell coverage while the UE is in idle mode.

Additionally, before release of the RRC connection (see FIG. 6), the UE has some frequency information regarding the NR network. After release of the RRC connection in dual connectivity, the UE may not be connected to the LTE network or the NR network. The UE may continue to use the NR frequency for coverage indication or measurement for some time, because that particular frequency may still be applicable for some time.

Moreover, to save power, the UE may use data activity, accelerometer/gyro sensor status, or display on/off to decide how often to perform the search and measurement of NR. Low data activity, low mobility, and providing for the display off option may lower the frequency to search or measure NR, thus saving power.

Figure 7:
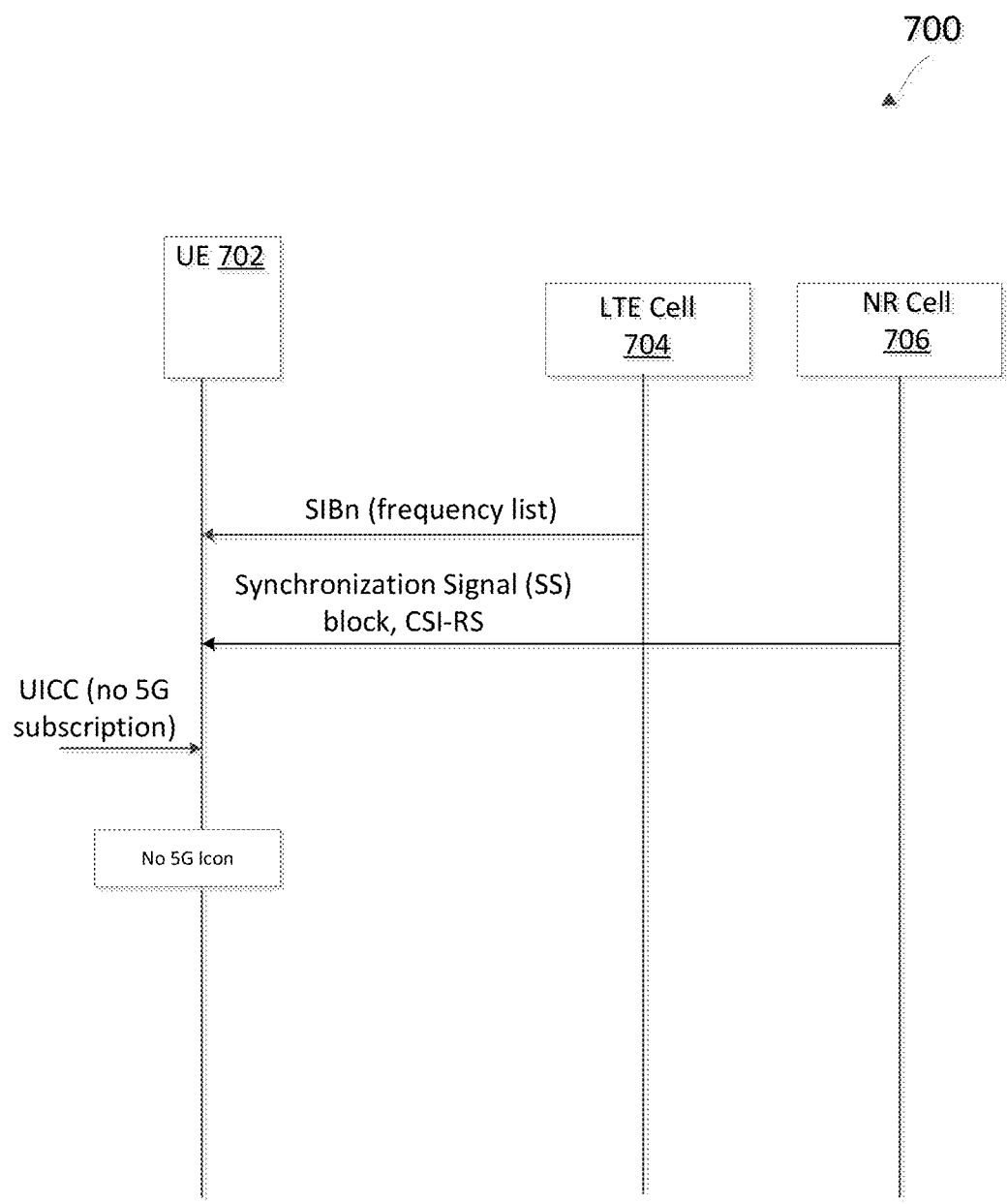
FIG. 7 illustrates a call flow according to embodiments of the present disclosure.

In some examples, the UE may connect to the NR network, but other factors may advocate against allowing the UE to do so. For example, the determination of whether to display an icon indicating that the UE is connected to a network may include the UE determining whether the UE has a subscription to the network. If the UE does not have a subscription to the network (e.g., NR network), it may be desirable to not allow the UE to display the icon (e.g., 5G icon). FIG. 7 illustrates a call flow 700 according to embodiments of the present disclosure. The LTE cell 704 may transmit the SIB including the frequency list, and the NR cell 706 may transmit the SS block and CSI-RS. The UE 702 determines whether the UE 702 has a subscription to the NR network. In response to a determination that the UE 702 does not have a subscription to the NR network, the UI 702 reports on the display that the UE 702 is not within coverage by the NR network. The UE 702 may include a Universal Integrated Circuit Card (UICC) indicating whether the UE 702 has a subscription to the NR network.

Figure 8:
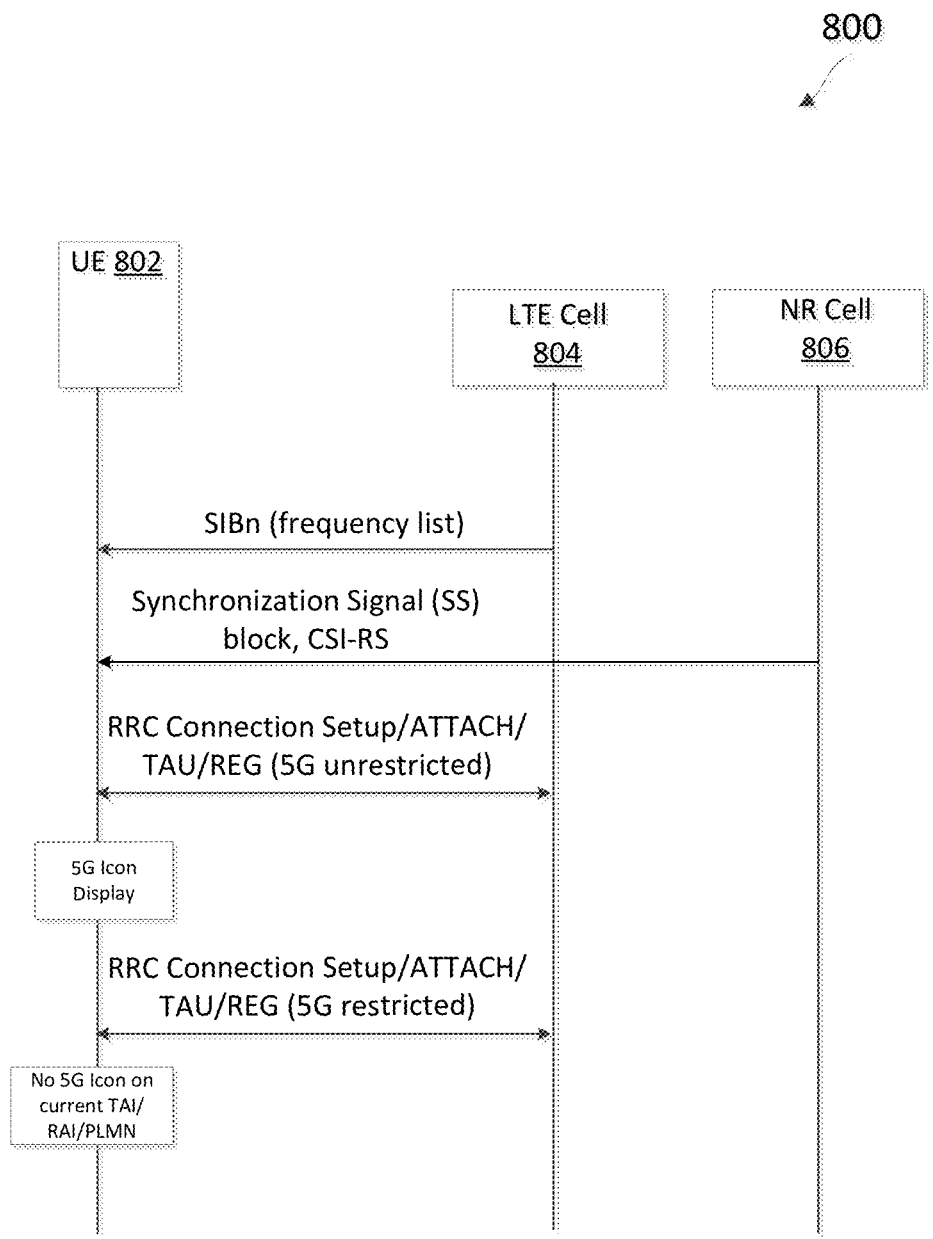
FIG. 8 illustrates a call flow according to embodiments of the present disclosure.

In another example, the determination of whether to display the 5G icon may include the UE determining whether the UE is restricted from connecting to the NR network. FIG. 8 illustrates a call flow 800 according to embodiments of the present disclosure. It may be desirable for the UE 802 to not display the 5G icon on the display for various reasons. For example, the UE may be in a Visited Public Land Mobile Network (VPLMN) (i.e., roaming network), and the UE is restricted from connecting to the NR network while on the VPLMN. In another example, the UE may be under a MME or AMF that restricts the UE from connecting to the NR network because of loading issues or because MME or AMF does not support the 5G RAN. In FIG. 8, the UE may receive an indication from the ATTACH ACCEPT or TRACKING AREA UPDATE ACCEPT or RESTRICTION ACCEPT message. In an example, the indication is an indication bit, RestrictDCNR. If the ATTACH/TAU/REG indicates 5G restriction for this PLMN or tracking area (or registration area), then the UE shall not show the 5G icon. Alternatively, such mobility restriction can be signaled by the RRC connection setup from the LTE cell while ATTACH, TAU, or REG procedure is performed. In response to a determination that the NR network is restricted from connecting to the NR network, the UI reports on the display no coverage by the NR network.

Figure 9:
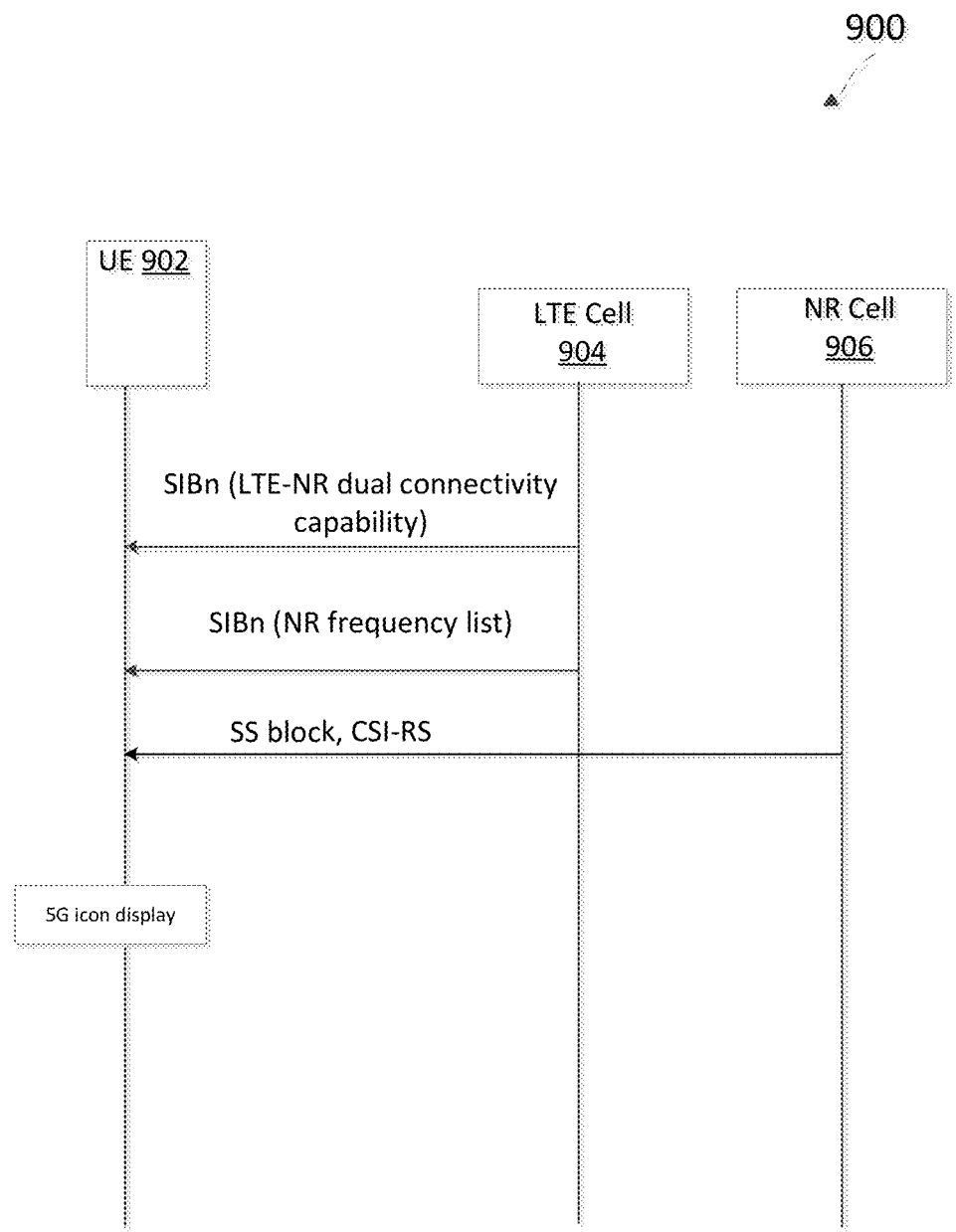
FIG. 9 illustrates a call flow according to embodiments of the present disclosure.

In another example, the determination of whether to display the 5G icon may include the UE determining whether the device (e.g., LTE cell) that provided the UE with information regarding whether the UE is within coverage by the NR network supports dual connectivity. FIG. 9 illustrates a call flow 900 according to embodiments of the present disclosure. Although the UE may support dual connectivity, the LTE cell itself may not support dual connectivity. To allow dual connectivity, the LTE cell typically interfaces with the NR cell and communicates with it, and it is possible for the LTE cell to not have this functionality. In FIG. 9, the LTE cell 904 may transmit a SIB including an indication of whether the LTE cell supports dual connectivity (e.g., LTE-NR dual connectivity capability). In an example, an existing SIB or a new SIB may include the NR frequency list with the indication of whether such dual connectivity is supported by the LTE cell. If the LTE cell supports dual connectivity, then the UE 902 may display the 5G icon on the display. If the LTE cell does not support dual connectivity, then the UE 902 is not able to be in the dual connectivity mode and connect to both the LTE network and NR network. In this example, the user may be confused if she sees the 5G icon on the display of the UE. In response to a determination that the device does not support dual connectivity, the UE 902 reports on the display no coverage by the NR network.

Figure 10:
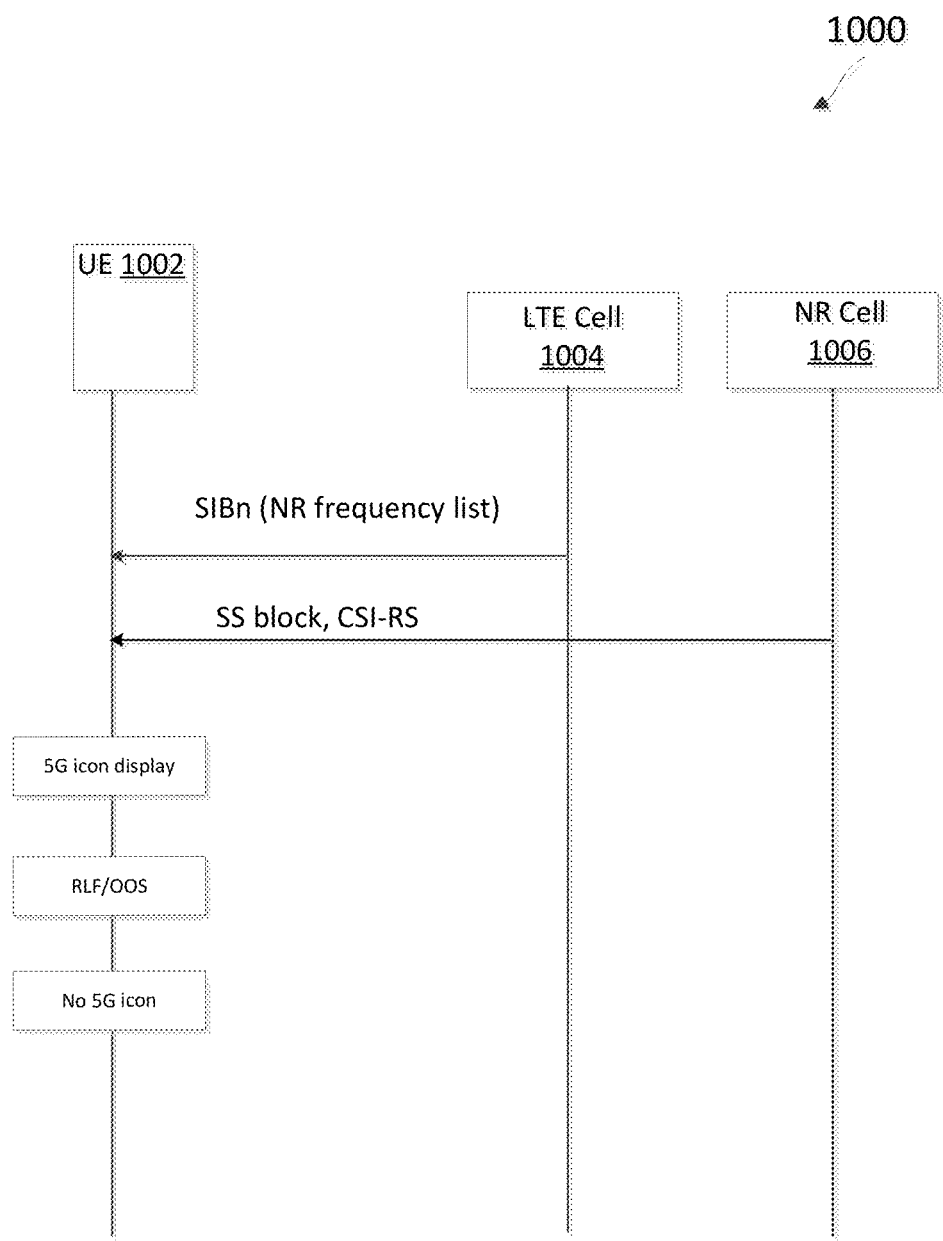
FIG. 10 illustrates a call flow according to embodiments of the present disclosure.

FIG. 10 illustrates a call flow 1000 according to embodiments of the present disclosure. If the UE 1002 is connected to the NR network, the UE is also connected to the LTE network. If the LTE network has an issue, such as a radio link failure (RLF) while the UE is connected to the LTE network or is out of service (OOS) while the UE is in the idle mode, the UE 1002 may be unable to connect to the NR network. The NR network relies on a healthy LTE link to set up the RRC connection before the UE can have dual connectivity and transmit data on the NR network.

In an example, the determination of whether to display the 5G icon may include the UE 1002 determining whether the LTE network includes a RLF while the UE is in the connected mode (e.g., connected to the LTE network and the NR network, or connected to the LTE network, but not the NR network). In response to a determination that the LTE network includes the RLF, the UE 1002 reports on the display no coverage by the NR network. In another example, the determination of whether to display the 5G icon may include the UE 1002 determining whether the LTE network is OOS while the UE is in the idle mode. In response to detecting that the LTE network is OOS, the UE 1002 reports on the display no coverage by the NR network. Accordingly, if the UE 1002 detects that the LTE network has a RLF while the UE is in connected mode or that the LTE network is OOS while the UE is in idle mode, then the UE does not display the 5G icon, even if the UE has a healthy link with the NR cell.

Figure 11:
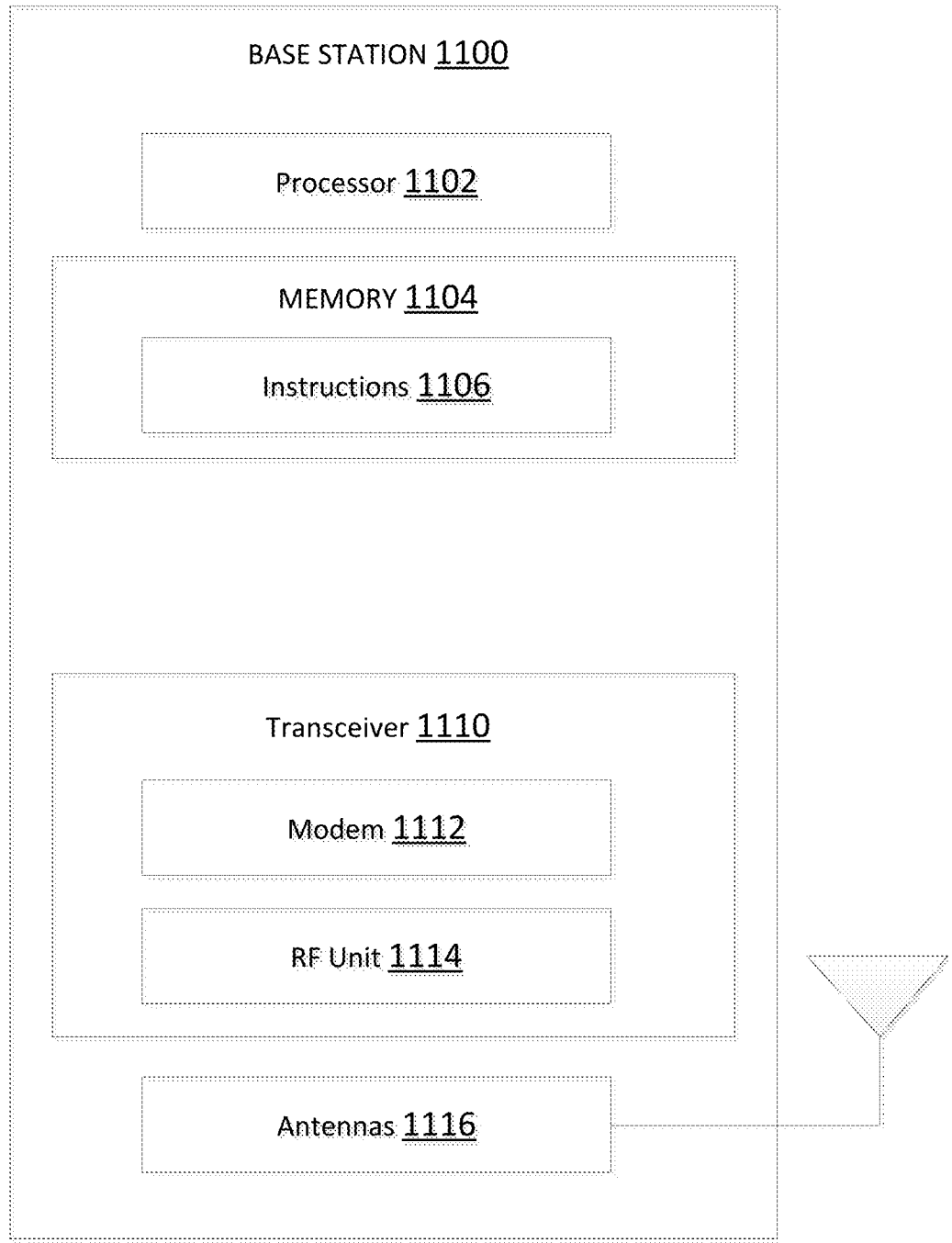
FIG. 11 is a block diagram of an exemplary base station (BS) according to embodiments of the present disclosure.

FIG. 11 is a block diagram of an exemplary BS 1100 according to embodiments of the present disclosure. The BS 1100 may be a BS 105 as discussed above. As shown, the BS 1100 may include a processor 1102, a memory 1104, a transceiver 1110 including a modem subsystem 1112 and a RF unit 1114, and one or more antennas 1116. These elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 1104 may include a non-transitory computer-readable medium. The memory 1104 may store instructions 1106. The instructions 1106 may include instructions that, when executed by the processor 1102, cause the processor 1102 to perform operations described herein. Instructions 1106 may also be referred to as code, which may be interpreted broadly to include any type of computer-readable statement(s) as discussed above with respect to FIG. 11.

As shown, the transceiver 1110 may include the modem subsystem 1112 and the RF unit 1114. The transceiver 1110 can be configured to communicate bi-directionally with other devices, such as the UEs 115 and/or another core network element. The modem subsystem 1112 may be configured to modulate and/or encode data according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data from the modem subsystem 1112 (on outbound transmissions) or of transmissions originating from another source such as a UE 115. The RF unit 1114 may be further configured to perform analog beamforming in conjunction with the digital beamforming. Although shown as integrated together in transceiver 1110, the modem subsystem 1112 and the RF unit 1114 may be separate devices that are coupled together at the BS 105 to enable the BS 105 to communicate with other devices.

The RF unit 1114 may provide the modulated and/or processed data, e.g. data packets (or, more generally, data messages that may contain one or more data packets and other information), to the antennas 1116 for transmission to one or more other devices. This may include, for example, transmission of information to complete attachment to a network and communication with a camped UE 115 according to embodiments of the present disclosure. The antennas 1116 may further receive data messages transmitted from other devices and provide the received data messages for processing and/or demodulation at the transceiver 1110. The antennas 1116 may include multiple antennas of similar or different designs in order to sustain multiple transmission links.

Figure 12:
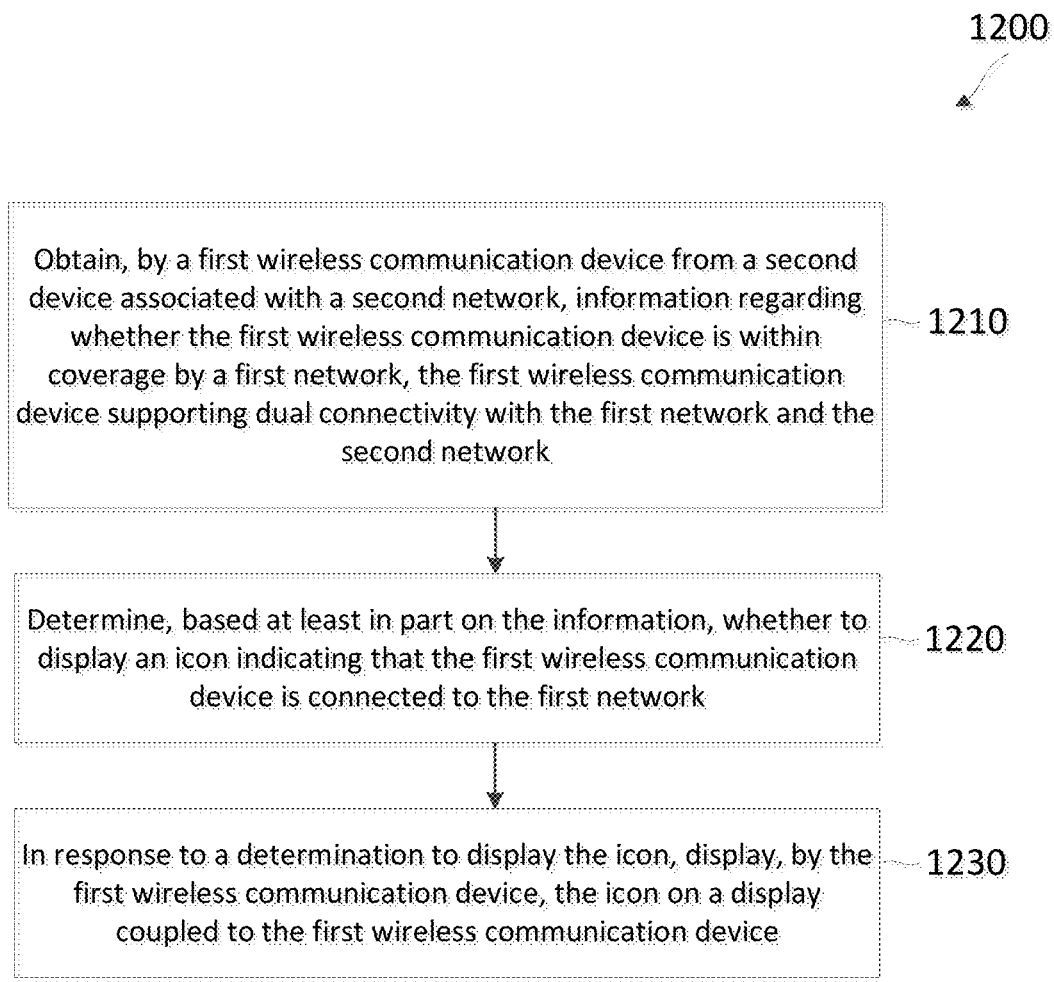
FIG. 12 is a flow diagram of a method of wireless communication in a network system according to embodiments of the present disclosure.

FIG. 12 is a flow diagram of a method 1200 of wireless communication in a network system such as the system 200 according to embodiments of the present disclosure. Steps of the method 1200 can be executed by a computing device (e.g., a processor, processing circuit, and/or other suitable component) of a wireless communication device, such as the UEs. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes obtaining, by a first wireless communication device (e.g., the UE) from a second device (e.g., the LTE cell, acquisition database, etc.) associated with a second network (e.g., LTE network), information regarding whether the first wireless communication device is within coverage by a first network (e.g., NR network), the first wireless communication device supporting dual connectivity with the first network and the second network.

At step 1220, the method 1200 includes determining, based at least in part on the information, whether to display an icon (e.g., 5G icon) indicating that the first wireless communication device is connected to the first network.

At step 1230, the method 1200 includes in response to a determination to display the icon, displaying, by the first wireless communication device, the icon on a display coupled to the first wireless communication device.

Figure 13:
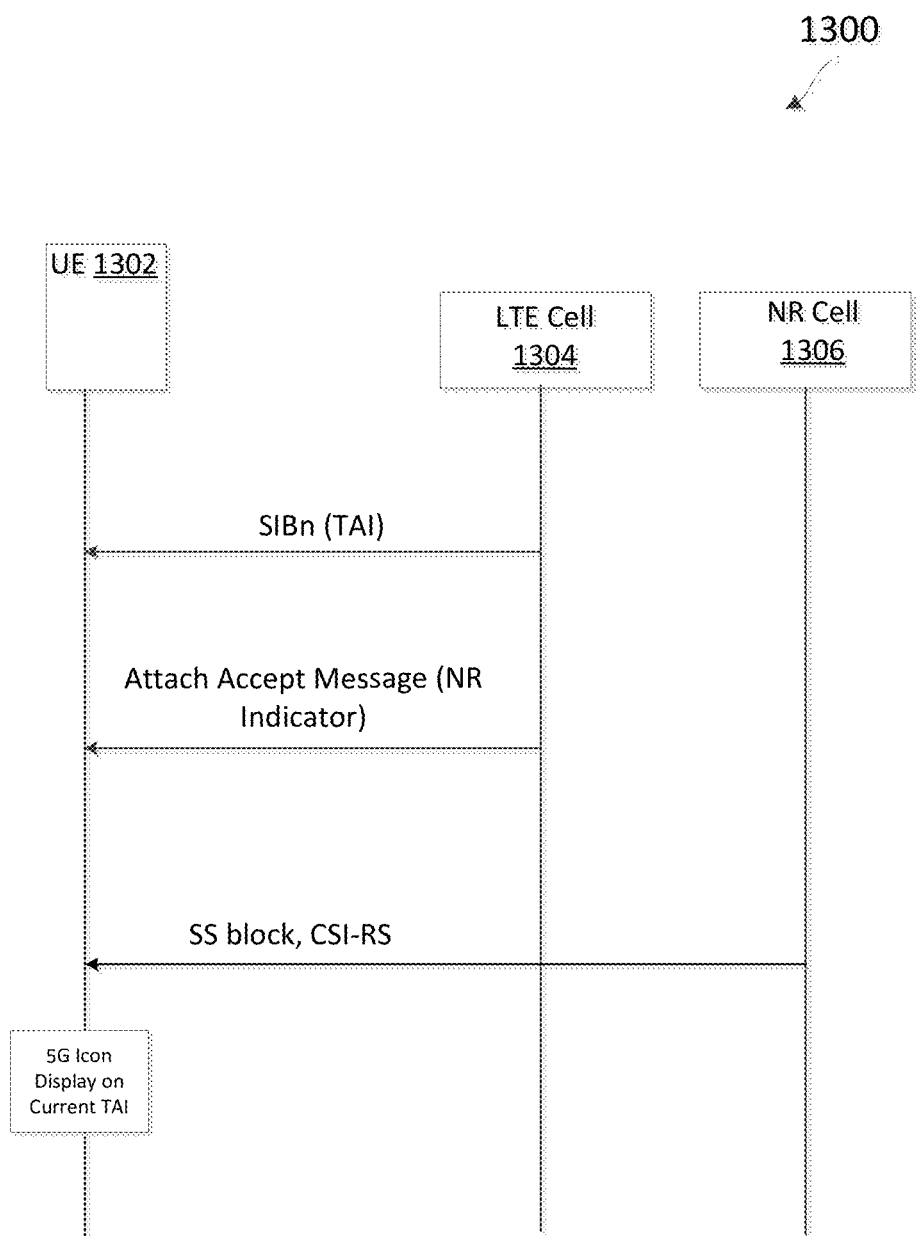
FIG. 13 illustrates a call flow using Non-Access Stratum (NAS) signaling according to embodiments of the present disclosure.

In some examples, one or more LTE cells may provide an indication using Non-Access Stratum (NAS) signaling regarding whether an UE is within coverage by an NR network. The NAS is a set of protocols that may be used for communication in the LTE and/or 5G core network, and in particular may be used to convey non-radio signaling between the UE and the MME for an LTE core network or AMF for a 5G core network. FIG. 13 illustrates a call flow 1300 using NAS signaling according to embodiments of the present disclosure. In the example illustrated in FIG. 13, an LTE cell 1304 transmits a SIB including a TAI of the LTE cell 1304. For example, SIB1 may contain the TAI of the LTE cell 1304. Each eNB may contain cells belonging to different tracking area (TAs), whereas each cell belongs to only one TA.

The LTE cell 1304 also transmits an Attach Accept message including an NR indicator. The Attach Accept message may be sent via the LTE cell 1304 in response to an Attach Request message (not shown) sent by the UE 1302. The UE 1302 may send the Attach Request message if, for example, the UE needs to access to the network at the first times. The core network (not shown) may send the Attach Accept message to the LTE cell 1304, which then forwards this Attach Accept message to the UE 1302. Additionally, an NR cell 1306 transmits an SS block and the CSI-RS. The NR cell 1306 supports the NR network.

In FIG. 13, the NR indicator may be represented by an indication bit indicating whether an NR cell is located within the TA identified by the TAI. In an example, the LTE cell 1304 is located within the TA identified by the TAI. If the NR indicator indicates that an NR cell is located within the TA identified by the TAI and the UE 1302 is located within the TA, the UE 1302 may determine that it is within coverage by the NR network. In this example, the UE 1302 may determine to display the 5G icon on a display coupled to the UE 1302. In FIG. 13, as long as the UE 1302 is still located within this TA, which may include multiple cells, the UE 1302 may determine that it is within coverage by the NR network. In contrast, if the NR indicator indicates that no NR cells are located within the TA identified by the TAI and the UE 1302 is located within the TA, the UE 1302 may determine that it is not within coverage by the NR network. In this example, the UE 1302 may determine to not display the 5G icon on the display coupled to the UE 1302.

In reference to FIG. 3, the receiver 311 may obtain the information 315 by receiving the SIB including the TAI and the Attach Accept message from the LTE cell 1304 and receiving the SS block and the CSI-RS from the NR cell 1306.

Figure 14:
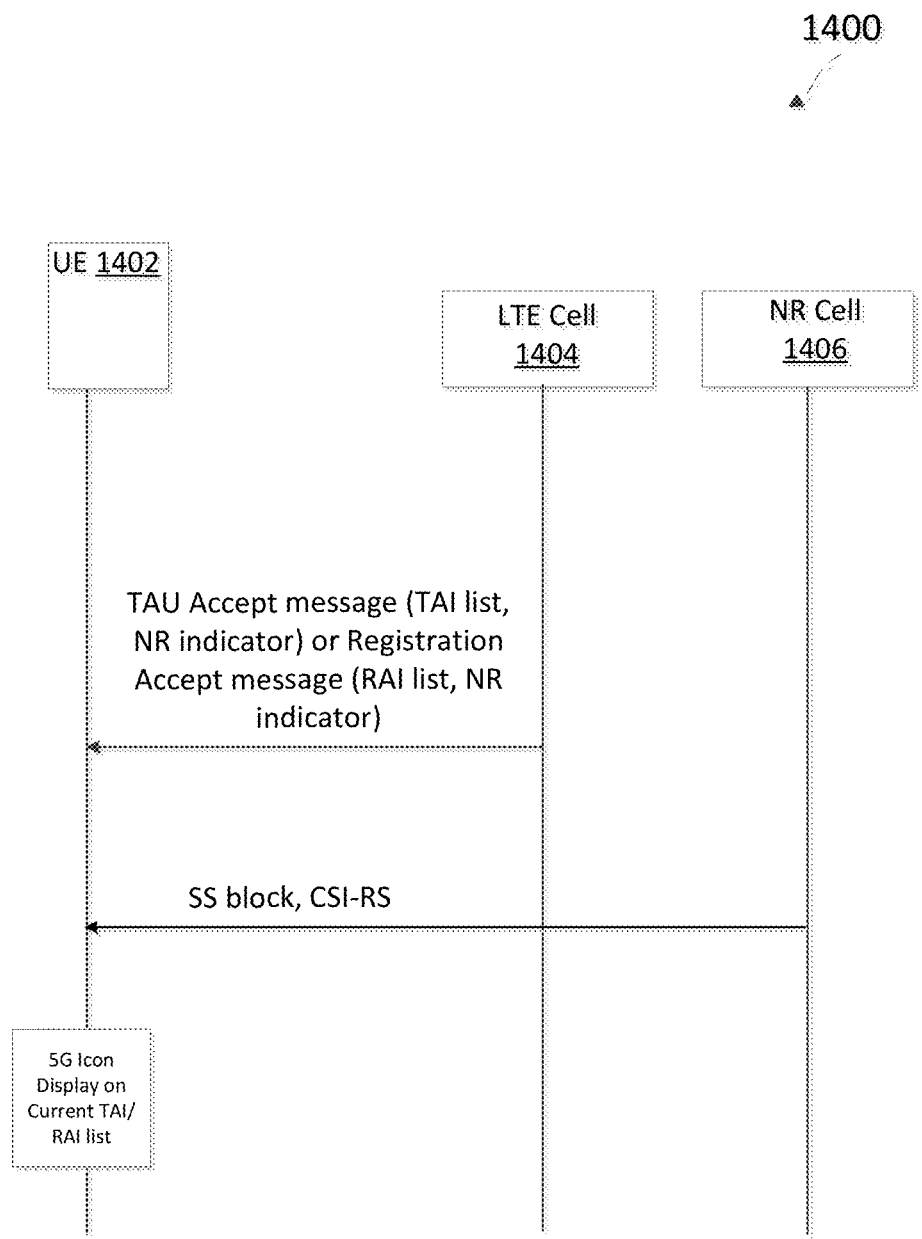
FIG. 14 illustrates a call flow using NAS signaling according to embodiments of the present disclosure.

FIG. 14 illustrates a call flow 1400 using NAS signaling according to embodiments of the present disclosure. In the example illustrated in FIG. 14, an LTE cell 1404 transmits a Tracking Area Update (TAU) Accept message including a TAI list and an NR indicator and/or transmits a Registration Accept message including a Registration Area (RA) Identifier (RAI) list and an NR indicator. Each eNB may contain cells belonging to different RAs, whereas each cell belongs to only one RA. A TA and TAI may be associated with an LTE core network, and an RA and RAI list may be associated with a 5G core network. Additionally, in FIG. 14, an NR cell 1406 transmits an SS block and the CSI-RS. The NR cell 1406 supports the NR network.

The TAU Accept message may be sent by the LTE cell 1404 in response to a TAU Request message (not shown) sent by the UE 1402. The UE 1402 may send the TAU Request message if, for example, a time period had elapsed (e.g., every 30 minutes) or if the UE 1402 determines that the LTE cell 1404 is not identified by a TAI included in a TAI list received by the UE 1402 in a previous TAU Accept message. The core network (not shown) may send the TAU Accept message to the LTE cell 1404, which then forwards this TAU Accept message to the UE 1402.

In FIG. 14, the NR indicator may be represented by an indication bit indicating whether an NR cell is located within a TA identified by a TAI included in the TAI list. If the NR indicator indicates that an NR cell is located within a TA identified in the TAI list and the UE 1402 is located within the aforementioned TA, the UE 1402 may determine that it is within coverage by the NR network. In this example, the UE 1402 may determine to display the 5G icon on a display coupled to the UE 1402. As long as the UE 1402 is located within any TA identified by a TAI included in the TAI list, the UE 1402 may determine that it is within coverage by the NR network. For example, if the UE 1402 is located in different TAs identified in the TAI list, the UE 1402 may determine that is within coverage by the NR network and continue to display the 5G icon. In contrast, if the NR indicates that no NR cells are located within any TAs identified in the TAI list and the UE 1402 is located within a TA identified in the TAI list, the UE 1402 may determine that it is not within coverage by the NR network. In this example, the UE 1402 may determine to not display the 5G icon on the display coupled to the UE 1402.

In reference to FIG. 3, the receiver 311 may obtain the information 315 by receiving the TAU Accept Message including the TAI list and the NR indicator from the LTE cell 1404 and receiving the SS block and the CSI-RS from the NR cell 1406.

The Registration Accept message may be sent by the LTE cell 1404 in response to a Registration Request message (not shown) sent by the UE 1402. The UE 1402 may send the Registration Request message if, for example, a time period has elapse (e.g., every 30 minutes) or if the UE 1402 determines that the LTE cell 1404 is not identified by a RAI included in an RAI list received by the UE 1402 in a previous Registration Accept message. The core network (not shown) may send the Registration Accept message to the LTE cell 1404, which then forwards this Registration Accept message to the UE 1402. In FIG. 14, the NR indicator may be represented by an indication bit indicating whether an NR cell is located within the RAI included in the RAI list sent in the Registration Accept message.

In FIG. 14, the NR indicator may be represented by an indication bit indicating whether an NR cell is located within an RA identified by an RAI included in the RAI list. If the NR indicator indicates that an NR cell is located within an RA identified by an RAI included in the RAI list and the UE 1402 is located within the aforementioned RA, the UE 1402 may determine that it is within coverage by the NR network and accordingly determine to display the 5G icon on a display coupled to the UE 1402. As long as the UE 1402 is located within any RA identified in the RAI list, the UE 1402 may determine that it is within coverage by the NR network. For example, if the UE 1402 is located in different RAs identified in the RAI list, the UE 1402 may determine that is within coverage by the NR network and continue to display the 5G icon. In contrast, if the NR indicates that no NR cells are located within a RA identified in the RAI list and the UE 1402 is located within the aforementioned RA, the UE 1402 may determine that it is not within coverage by the NR network. In this example, the UE 1402 may determine to not display the 5G icon on the display coupled to the UE 1402.

In reference to FIG. 3, the receiver 311 may obtain the information 315 by receiving the Registration Accept message including the RAI list and the NR indicator from the LTE cell 1404 and receiving the SS block and the CSI-RS from the NR cell 1406.

In some examples, the TAU Accept message or the Registration Accept message includes at least two NR indicators, where a first NR indicator indicates that an NR cell is located within an TA/RA identified in a first TAI/RAI list and a second NR indicator indicates that no NR cells are located within a TA/RA identified in a second TAI/RAI list.

Figure 15:
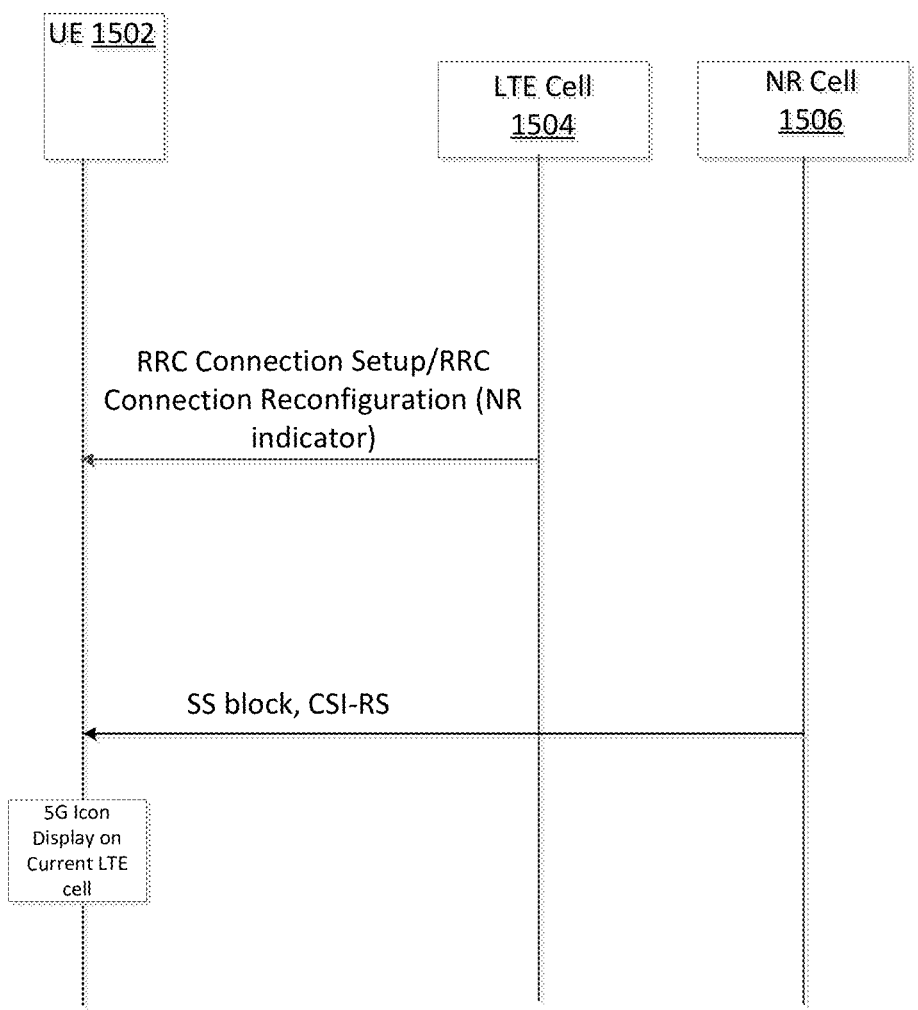
FIG. 15 illustrates a call flow using dedicated radio resource configuration (RRC) signaling according to embodiments of the present disclosure.

In some examples, one or more LTE cells may provide an indication using dedicated RRC signaling regarding whether an UE is within coverage by an NR network. FIG. 15 illustrates a call flow 1500 using dedicated RRC signaling according to embodiments of the present disclosure. In the example illustrated in FIG. 15, an LTE cell 1504 transmits an RRC connection setup/RRC connection reconfiguration message including an NR indicator. The NR indicator may be represented by an indication bit indicating whether a neighbor cell of the LTE cell 1504 provides NR coverage. The LTE cell 1504 may use dedicated RRC signaling by transmitting this message specifically to the UE 1502 and not broadcasting it. Additionally, an NR cell 1506 transmits an SS block and the CSI-RS. The NR cell 1506 supports the NR network.

If the NR indicator indicates that a neighboring cell of the LTE cell 1504 provides NR coverage, the UE 1502 may determine that it is within coverage by the NR network and thus determine to display the 5G icon on a display coupled to the UE 1502. In contrast, if the NR indicator indicates that no neighboring cells of the LTE cell 1504 provide NR coverage, the UE 1502 may determine that it is not within coverage by the NR network and thus determine to not display the 5G icon on the display.

In reference to FIG. 3, the receiver 311 may obtain the information 315 by receiving the RRC connection setup/ RRC connection reconfiguration message including the NR indicator from the LTE cell 1504 and receiving the SS block and the CSI-RS from the NR cell 1506.

Figure 16:
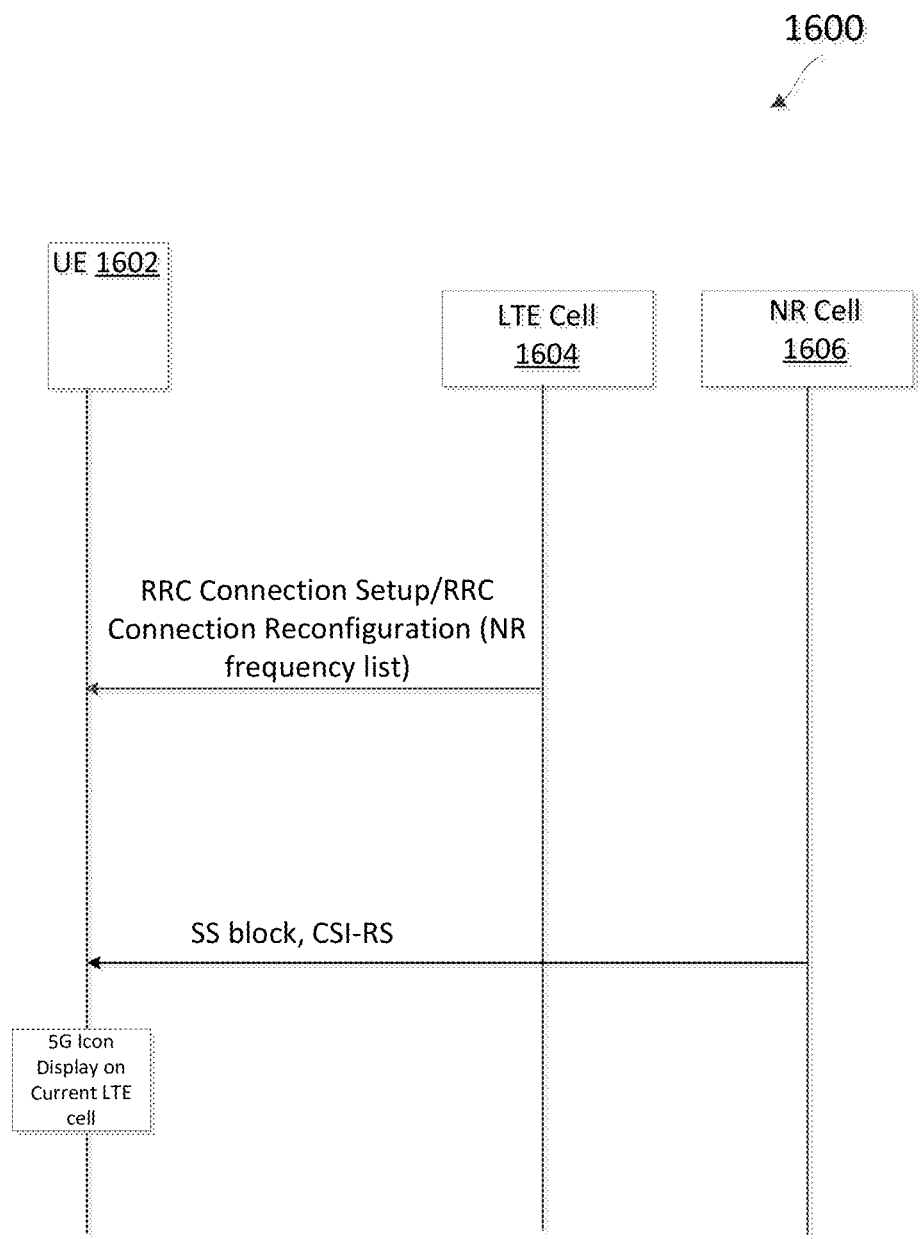
FIG. 16 illustrates a call flow using dedicated RRC signaling according to embodiments of the present disclosure.

FIG. 16 illustrates a call flow 1600 using dedicated RRC signaling according to embodiments of the present disclosure. In the example illustrated in FIG. 16, an LTE cell 1604 transmitting an RRC connection setup/RRC connection reconfiguration message including an NR frequency list. The NR frequency list includes one or more NR frequencies in which the NR network operates. Additionally, an NR cell 1606 transmits an SS block and the CSI-RS. The NR cell 1606 supports the NR network.

The UE 1602 may search for the NR frequencies included in the NR frequency list. If the UE 1602 detects one or more of the NR frequencies listed in the NR frequency list, the UE 1602 may determine that it is within coverage by the NR network and accordingly display the 5G icon. In contrast, if the UE 1602 does not detect any of the frequencies listed in the NR frequency list, the UE 1602 may determine that it is not within coverage by the NR network and accordingly does not display the 5G icon.

In reference to FIG. 3, the receiver 311 may obtain the information 315 by receiving the RRC connection setup/RRC connection reconfiguration message including the NR frequency list from the LTE cell 1604 and receiving the SS block and the CSI-RS from the NR cell 1606.

In some examples, the UE 1302, 1402, 1502, and 1602 may perform a search for NR frequencies associated with the NR cell 1306, 1406, 1506, and 1606, respectively. The UE may cache this frequency information associated with the NR cell and associate the appropriate frequencies with the NR cell. If the UE later comes into contact with an LTE cell that provided some kind of information to the UE that it was within coverage by the NR network, the UE may determine that the UE is within coverage by the NR network. Additionally, the UE may measure the signal strength and display a bar chart of the 5G network, where the bar chart indicates a strength of the 5G network.

The eNodeB may send a SIB to the UE. In an example, the SIB indicates whether the eNodeB can add the NR network as a secondary RAT for dual connectivity and there is NR coverage. If the eNodeB can add the NR network as a secondary RAT, the eNodeB is able to support dual connectivity and establish a connection to the LTE network and the NR network for the UE. Rather than immediately display the 5G icon, the UE may take into consideration other factors before displaying the 5G icon. In some examples, the UE may take into consideration restrictions of the network on NR (e.g., based on local policy). For example, it may be advantageous to take into consideration local policies of the VPLMN (e.g., roaming agreement for the NR network). In an example, if a user of the UE resides in the United States and travels to Mexico, the VPMLN MME local policies may restrict the user's access to the NR network. The VPMLN MME local policies may be configured for the Quality of Service (QoS) limitation of roaming users.

Figure 17:
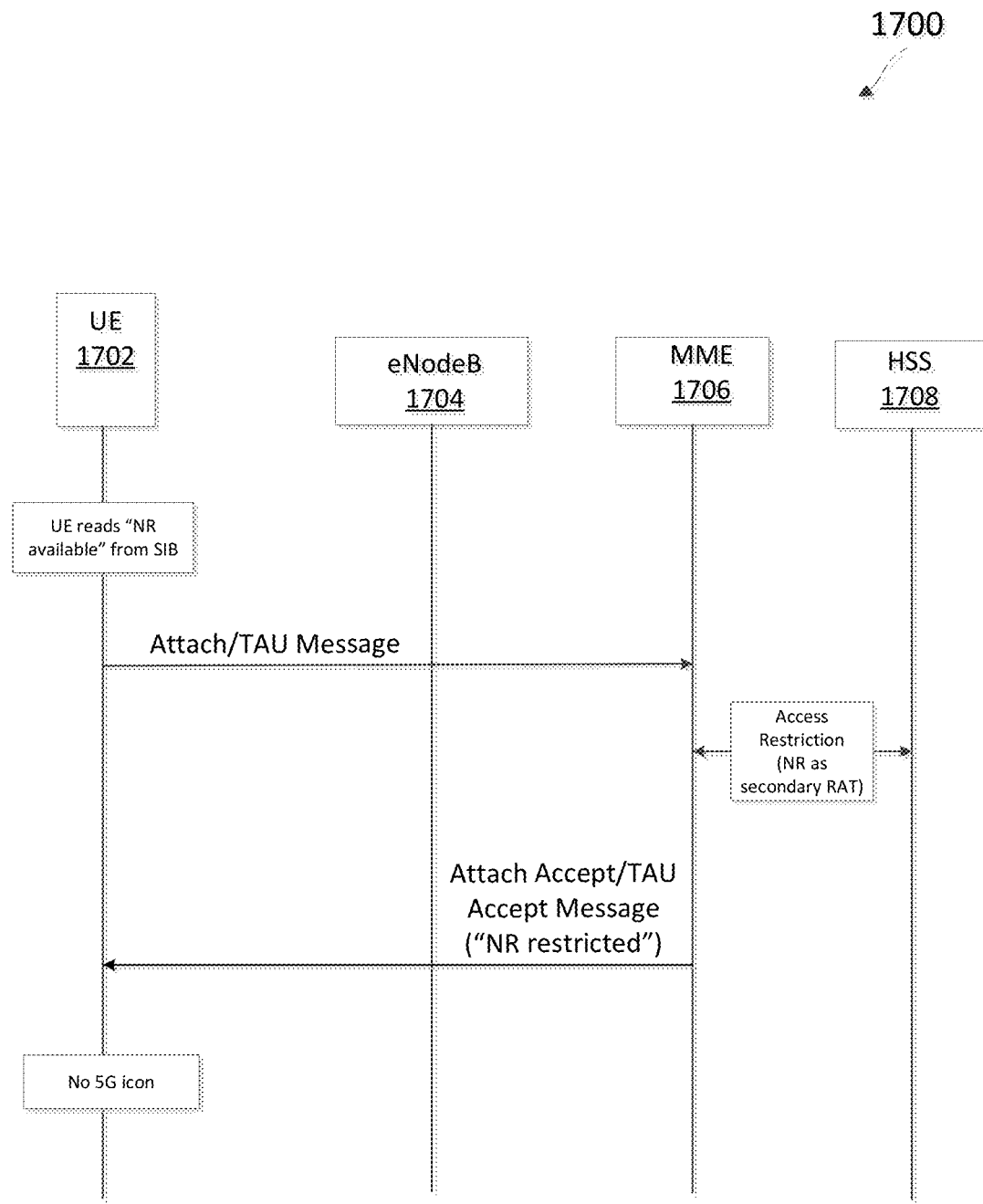
FIG. 17 illustrates a call flow that takes into consideration one or more restrictions of the NR network based on network policies according to embodiments of the present disclosure.

FIG. 17 illustrates a call flow 1700 that takes into consideration one or more restrictions of the NR network based on network policies according to embodiments of the present disclosure. In the example illustrated in FIG. 17, the UE 1702 receives a SIB indicating that the NR network is available. In an example, the UE 1702 is camped on an E-UTRA cell that provides the indication. In some examples, to determine whether to display the 5G icon, the UE 1702 determines whether a restriction of the NR network applies to the UE. The UE 1702 may send an Attach/TAU message to the MME 1706.

The MME 1706 checks with the HSS 1708 for the subscription based access control for the NR as a secondary RAT for dual connectivity. The HSS 1708 may send to the MME 1706 an Access Restriction message indicating that the NR is restricted as a secondary RAT for the UE. If the subscription based access restriction (e.g., VPLMN restriction) is provided from the HSS, an indicator may be transmitted in NAS to the UE with this information. In some examples, if the UE 1702 does not receive the "NR restricted" indication in NAS, the UE displays the 5G indicator (e.g., 5G icon) on the screen of the UE. In contrast, if the UE 1702 receives the "NR restricted" indication in NAS, the UE does not display the 5G indicator on the screen.

The MME 1706 receives the Access Restriction message from the HSS 1708 and sends an Attach Accept/TAU Accept message to the UE 1702. In this example, the Attach Accept/TAU Accept message indicates that the NR as a secondary RAT is restricted. In an example, if the UE 1702 receives a message indicating that the NR is restricted, the UE 1702 does not display the 5G icon, even if the UE has received an SIB indicating that NR is available.

A PLMN is identified by the Mobile Country Code (MCC) and the Mobile Network Code (MNC). An LTE cell may broadcast one or more SIBs (e.g., SIB1), which indicate the PLMN ID to which the cell belongs. If the UE 1702 is camped on an LTE cell and the Attach Accept/TAU Accept message indicates that the NR as a secondary RAT is restricted. The UE 1702 may determine to not display the 5G icon on the current PLMN (even if the UE has received an SIB indicating that NR is available). In some examples, the Attach Accept/TAU Accept message includes a list of PLMN IDs (i.e. equivalent PLMN list), and each PLMN ID included in the list identifies a PLMN that applies the NR restriction. In an example, the UE 1702 may determine to not display the 5G icon on any PLMN identified in the PLMN list (even if the UE has received an SIB indicating that NR is available).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communications, comprising:
obtaining, by a first wireless communication device in a broadcast communication from a long-term evolution (LTE) cell associated with an LTE network, information regarding whether the first wireless communication device is within coverage by a new radio (NR) network, the first wireless communication device supporting dual connectivity with the NR network and the LTE network;
displaying, by the first wireless communication device in response to a determination that the first wireless communication device is not restricted from connecting to the NR network, an icon indicating that the first wireless communication device is connected to the NR network on a display coupled to the first wireless communication device, the displaying the icon being associated with the information from the LTE cell; and
displaying, by the first wireless communication device in response to a determination that the first wireless communication device is restricted from connecting to the NR network, a report of no coverage by the NR network on the display.

2. The method of claim 1, wherein the first wireless communication device supports a non-standalone mode that utilizes the LTE network to support the connectivity of the first wireless communication device to the NR network.

3. The method of claim 1, wherein the NR network includes a 5G network.

4. The method of claim 1, wherein the LTE network includes a 4G network.

5. The method of claim 1, wherein the icon includes a mobile network signal strength indicator associated with the NR network.

6. The method of claim 1, wherein the NR network is associated with an NR cell.

7. The method of claim 1, wherein obtaining the information includes receiving a broadcast of a system information block (SIB) with an indication of whether the first wireless communication device is within coverage by the NR network.

8. The method of claim 7, wherein the indication includes an indication bit indicating whether the first wireless communication device is within coverage by the NR network.

9. The method of claim 1, wherein obtaining the information includes receiving a system information block (SIB) that includes a frequency list including the one or more frequencies in which the NR network operates.

10. The method of claim 1, wherein obtaining the information includes receiving a broadcast of a frequency list including the one or more frequencies in which the NR network operates.

11. The method of claim 1, wherein obtaining the information includes receiving a measurement object that includes a frequency list specifying frequencies in which the NR network operates and provides bandwidth of a frequency channel, the method further comprising:
searching, by the first wireless communication device, the one or more frequencies in accordance with the measurement object; and
measuring the one or more frequencies to determine whether the first wireless communication device is within coverage by the NR network.

12. The method of claim 11, wherein the measurement object is an NR measurement object and the frequency list specifies NR frequencies in which the NR network operates.

13. The method of claim 1, wherein obtaining the information includes retrieving the information from an acquisition database storing the information, the information including NR frequencies within which the NR network operates.

14. The method of claim 1, further comprising:
determining, by the first wireless communication device, whether the first wireless communication device has a subscription to the NR network; and
reporting no coverage by the NR network on the display in response to a determination that the first wireless communication device does not have the subscription.

15. The method of claim 14, wherein the first wireless communication device includes a Universal Integrated Circuit Card (UICC) indicating whether the first wireless communication device has the subscription to the NR network.

16. The method of claim 1, further comprising:
obtaining, by the first wireless communication device from the LTE cell, a message indicating whether the first wireless communication device is restricted from connecting to the NR network.

17. The method of claim 1, further comprising:
determining, by the first wireless communication device, whether a second device associated with the LTE cell supports dual connectivity; and
reporting no coverage by the NR network on the display in response to a determination that the second device does not support dual connectivity.

18. The method of claim 1, wherein the first wireless communication device is in at most one state of a plurality of states, wherein if the first wireless communication device is connected to the NR and LTE networks simultaneously, the first wireless communication device is in a first connected mode, wherein if the first wireless communication device is connected to the LTE network, but not the NR network, the first wireless communication device is in a second connected mode, and wherein if the first wireless communication device is idle, the first wireless communication device is in an idle mode connected to the LTE network, but not the NR network.

19. The method of claim 18, further comprising:
determining, by the first wireless communication device, whether the LTE network includes a radio link failure (RLF) while the first wireless communication device is in the first or second connected mode; and
reporting no coverage by the NR network on the display in response to a determination that the LTE network includes the RLF while the first wireless communication device is in the first or second connected mode.

20. The method of claim 18, further comprising:
detecting, by the first wireless communication device, whether the LTE network is out of service (OOS) while the first wireless communication device is in the idle mode; and
reporting no coverage by the NR network on the display in response to detecting that the LTE network is OOS while the first wireless communication device is in the idle mode.

21. The method of claim 1, wherein the displaying the icon is further based on a measurement associated with a Synchronization Signal (SS) block associated with one or more frequencies in which the NR network operates.

22. The method of claim 21, wherein obtaining the information includes receiving a frequency list including the one or more frequencies in which the NR network operates.

23. The method of claim 22, further comprising:
for one or more frequencies listed in the frequency list:
receiving, by the first wireless communication device from a third wireless communication device, the SS block including an NR-PSS (primary synchronization signal) and an NR-SSS (secondary synchronization signal), the third wireless communication device including a cell that supports the NR network;
measuring a signal strength of the NR-PSS and the NR-SSS;
determining whether the signal strength satisfies a threshold; and
at least one of:
in response to a determination that the signal strength satisfies the threshold, determining to display the icon; or
in response to a determination that the signal strength does not satisfy the threshold, determining to not display the icon.

24. The method of claim 22, further comprising:
for one or more frequencies listed in the frequency list:
receiving, by the first wireless communication device from a third wireless communication device, the SS block including an NR-PBCH (Physical Broadcast Channel), the third wireless communication device including a cell that supports the NR network;
determining system frame number information and an NR bandwidth of a frequency channel associated with the NR-PBCH; and
measuring a CSI-RS (Channel State Information Reference Signal) based on the system frame number information and the NR bandwidth to determine whether the first wireless communication device is within coverage by the NR network.

25. A system for wireless communications, comprising:
a receiver that obtains information, in a broadcast communication from a second device associated with a long-term evolution (LTE) network, regarding whether a first wireless communication device is within coverage by a new radio (NR) network, wherein the first wireless communication device supports dual connectivity with the NR network and the LTE network;
a user interface (UI) that displays, in response to a determination that the first wireless communication device is not restricted from connecting to the NR network, an icon indicating that the first wireless communication device is connected to the NR network on a display coupled to the first wireless communication device, associated with the information from the second device associated with the LTE network; and
the UI displays, in response to a determination that the first wireless communication device is restricted from connecting to the NR network, a report of no coverage by the NR network on the display.

26. The system of claim 25, wherein the NR network includes a 5G network.

27. The system of claim 25, wherein the LTE network includes a 4G network.

28. The system of claim 25, wherein the UE displays the icon further based on a measurement associated with a Synchronization Signal (SS) block associated with one or more frequencies in which the NR network operates.

29. The system of claim 25, wherein the second device includes an LTE cell that supports the LTE network.

30. A non-transitory computer-readable medium having program code recorded thereon, the program code comprising:
code for obtaining, in a broadcast communication by a first wireless communication device from a second device associated with a long-term evolution (LTE) network, information regarding whether the first wireless communication device is within coverage by a new radio (NR) network, the first wireless communication device supporting dual connectivity with the NR network and the LTE network;
code for displaying, in response to a determination that the first wireless communication device is not restricted from connecting to the NR network, an icon indicating that the first wireless communication device is connected to the NR network, associated with the information from the second device associated with the LTE network; and
code for displaying, by the first wireless communication device in response to a determination that the first wireless communication device is restricted from connecting to the NR network, a report of no coverage by the NR network on the display.

* * * * *